(12) United States Patent
Sekiya

(10) Patent No.: US 7,222,564 B2
(45) Date of Patent: May 29, 2007

(54) APPARATUS FOR COOKING FOOD ON SKEWERS

(75) Inventor: Masayuki Sekiya, Tokyo (JP)

(73) Assignee: Forming Food's Trading Limited, Tokyo (JP)

( * ) Notice: Subject to any disclaimer, the term of this patent is extended or adjusted under 35 U.S.C. 154(b) by 297 days.

(21) Appl. No.: 10/719,335

(22) Filed: Nov. 21, 2003

(65) Prior Publication Data

US 2004/0099146 A1    May 27, 2004

(30) Foreign Application Priority Data

| Nov. 27, 2002 | (JP) | ............................. 2002-343877 |
| Jan. 6, 2003 | (JP) | ............................. 2003-000378 |
| Sep. 24, 2003 | (JP) | ............................. 2003-330822 |

(51) Int. Cl.
  *A47J 37/04* (2006.01)
(52) U.S. Cl. ..................... 99/421 P; 99/421 H; 99/419
(58) Field of Classification Search ............. 99/421 R, 99/421 H, 421 HH, 421 HV, 421 P, 419
See application file for complete search history.

(56) References Cited

U.S. PATENT DOCUMENTS

| 2,306,519 | A | * | 12/1942 | Bobo .................... 99/421 HH |
| 2,485,359 | A | * | 10/1949 | Cook et al. ................ 126/39 B |
| 2,533,080 | A | * | 12/1950 | Alexander ................ 99/443 C |
| 2,588,046 | A | * | 3/1952 | Ridgely .................. 99/421 HV |
| 3,363,543 | A | * | 1/1968 | Roberts et al. ......... 99/421 HV |
| 3,529,536 | A | * | 9/1970 | Milhem ........................ 99/346 |
| 5,632,098 | A | * | 5/1997 | Finch ............................ 34/63 |
| 5,669,290 | A | * | 9/1997 | Natsumi et al. .......... 99/421 H |
| 6,425,318 | B1 | * | 7/2002 | Kim ............................ 99/327 |

FOREIGN PATENT DOCUMENTS

| JP | 51-148059 | 12/1976 |
| JP | 5-285050 | 11/1993 |
| JP | 7-213433 | 8/1995 |
| JP | 8-280545 | 10/1996 |

OTHER PUBLICATIONS

Concise Statement of Relevance regarding Japanese Patent Application No. 51-148059 dated Dec. 18, 1976, previously submitted in the IDS filed Nov. 21 2003 (1 pg.).

English translation of Patent Abstracts of Japan Publication no. 05-285050 dated Nov. 2, 1993 previously submitted in the IDS filed Nov. 21, 2003 (4 pgs.).

(Continued)

*Primary Examiner*—Reginald L. Alexander
(74) *Attorney, Agent, or Firm*—Osha Liang LLP

(57) ABSTRACT

A roasting apparatus for cooking skewered food constituted by food and a skewer skewering the food includes a main apparatus body having a wall member forming a cooking space maintained within the food during cooking, a heater provided in such a manner that a heat-emitting section is positioned at an upper part of the cooking space, and a food holding mechanism for positioning food downwards from the heat-emitting section and being capable of holding horizontally laid skewers in a manner enabling free rotation about a center axis of the skewers, so as to enable heat from the heating means to be used effectively and enable the skewered food to be effectively cooked.

18 Claims, 25 Drawing Sheets

OTHER PUBLICATIONS

English translation of Patent Abstracts of Japan Publication no. 07-213433 dated Aug. 15, 1995 previously submitted in the IDS filed Nov. 21, 2003 (10 pgs.).

English translation of Patent Abstracts of Japan Publication no. 08-280545 dated Oct. 29, 1996 previously submitted in the IDS filed Nov. 21, 2003 (8 pgs.).

Patent Abstracts of Japan, Publication No. 05-285050 dated Nov. 2, 1993 (4 pgs.).

Patent Abstracts of Japan, Publication No. 07-213433 dated Aug. 15, 1995 (11 pgs.).

Patent Abstracts of Japan, Publication No. 08-280545 dated Oct. 29, 1996 (9 pgs.).

* cited by examiner

A-A

B-B

C - C

APPARATUS FOR COOKING FOOD ON SKEWERS

CROSS-REFERENCE TO RELATED APPLICATIONS

This application claims priority from Japanese Patent Application No. 2002-343877 filed Nov. 27, 2002, Japanese Patent Application No. 2003-000378 filed Jan. 6, 2003, and Japanese Patent Application No. 2003-330822 filed Sep. 24, 2003.

BACKGROUND OF THE INVENTION

1. Field of the Invention

The present invention relates to cooking apparatus for cooking skewered food constituted by food and a skewer skewering the food. The present invention particularly relates to cooking apparatus suited to the cooking of Japanese food referred to as "yakitori", where meat, vegetables, or seafood etc. are skewered by a skewer.

2. Background Art

Various apparatus for cooking food on a skewer such as "yakitori" are known in the related art. In a traditional method, lit charcoal is arranged in a heater cooker that is long in a widthwise direction, and the skewered food is lined up next to each other in parallel so as to be positioned above the charcoal, with a person then rotating the skewers as necessary. The food is then cooked by heat radiated from the charcoal. In this traditional method, it is necessary for a person to always be watching the skewered food.

With the above apparatus, a holding member used when cooking the food and heating means for cooking the food are located in the apparatus in a manner exposed to the outside. As a result, the food is cooked with part of the heat from the heating means being radiated to the outside and it is therefore not possible to effectively utilize heat from the heating means.

The present invention is therefore advantageous in providing a skewered food cooking apparatus and food supporting member for skewered food that is capable of cooking the food while effectively utilizing heat from a heating means.

SUMMARY OF THE INVENTION

An apparatus for cooking food on skewers of the present invention comprises a plurality of holding members for holding skewers skewering food, rotating means for rotating the holding members, and heating means for cooking food skewered by skewers rotated by the rotating means. The rotating means includes a plurality of rotational drive sources with adjustable speeds of rotation, with the rotational drive sources being respectively connected to one or a plurality of the plurality of holding members, with rotational speeds of the plurality of holding members being adjustable.

According to this cooking apparatus, a plurality of rotational drive sources are prepared, and the drive sources are connected respectively and individually connected to one or a plurality of the plurality of holding members so as to enable rotation of the plurality of holding members by individual rotational drive sources, and enable rotational speeds of the rotational drive sources to be adjustable, so that rotational speed of the plurality of holding members can be adjusted. As a result, even if intrinsic cooking times for the skewered food held respectively by the holding members are different, the respective skewered food can be made to finish cooking at the same time or substantially the same time by rotating the skewers at different rotational speeds.

The rotational drive sources may be any arbitrary means where rotational speed can be adjusted, with a typical example being an electric motor. The electric motor may be, for example, an A.C. motor where rotational speed can be changed using frequency modulation, a D.C. motor where rotational speed can be changed using voltage, or a pulse motor where rotational speed can be changed using a number of pulses. The rotational drive sources and holding members may be connected directly or may be connected via a transmission mechanism. A transmission mechanism for the latter case may be arbitrary in shape and structure and may be a gear type, belt type, or chain type, etc.

In one or more of the above embodiments, the heating means, rotational drive sources, and holding members may be arranged in a main apparatus body of the cooking apparatus. It is also possible to have an apparatus main body where heating means are provided and to have a plurality of cassettes that can be freely detached from or installed at the main apparatus body. Holding means and rotational drive sources are then arranged at respective cassettes so that it is possible to adjust rotational speed of holding members for each respective cassette.

The rotational speeds of the holding members can therefore be different for each cassette because rotational drive sources are arranged at each cassette. Because of this, a plurality of skewers skewering food with different cooking times are held in separate cassettes. By then making the rotational speeds of the holding members different so as to correspond to the cooking times of the foods, it is possible to finish cooking the respective skewered food at the same time or substantially the same time while cooking the plurality of skewered foods having different cooking times at separate cassettes.

When the cooking apparatus is provided with a main apparatus body and a plurality of cassettes, the number of holding members provided at each cassette may be one or a plurality of items. When a plurality of holding members are provided at one cassette, all of the holding members at the same cassette are made to be rotated at the same speed using drive force from rotational drive sources provided one for each cassette.

Further, in one or more of the above embodiments, it is preferable for the main apparatus body which the cassettes can be detached from and freely installed into be vertical oblong so as to have a larger longitudinal dimension than a widthwise direction from left to right. When the main apparatus body is made vertical oblong, it is possible for the cooking apparatus to be effectively located in kitchens of stores where space is at a premium.

When at least a plurality of the plurality of cassettes that can be detached from or freely installed at the main apparatus body are able to be installed in such a manner as to have a vertical positional relationship at the main apparatus body, it is possible for the main apparatus body to be made vertical oblong.

Further, in one or more of the above embodiments, in the case where a plurality of cassettes are installed at the main apparatus body with a vertical positional relationship, it is preferable for a juice receiving member, for receiving juice created during cooking of food skewed by skewers supported by the holding members provided at upper side cassettes, to be arranged at a position at a side lower than the holding members of the upper side cassettes.

As a result of doing this, even if juice created from the skewered food during cooking drops down when cooking the skewered food held by the skewers by the holding members of cassettes on the upper side, this juice is collected by a juice collecting dish and does not fall down any further. The juice does therefore not fall on the skewered food in the cassettes on the lower side and a situation where the taste of skewered food of cassettes on the lower side which is different food from the food skewered on the cassettes on the upper side is changed is avoided.

In one of more of the embodiments, the positional relationship of the heating means and the respective cassettes is arbitrary. In one example, a dual surface heating method where heat is generated from surfaces at mutually opposite sides, with the cassettes being arranged at positions opposite the respective heating surfaces of the heating means, and with the axial direction of central axes of rotation of the holding members provided at the cassettes being parallel with the heating surfaces.

As a result, it is possible to effectively position a plurality of cassettes for one heating means because cassettes can be arranged at positions facing both heating surfaces of a single heating means. Further, it is also possible for the skewered food in its entirety to face heating surfaces and be cooked by rotating the holding parts because the axial directions of the axial centers of rotation of the holding members at the cassettes are in a direction parallel with the heating surfaces of the heating means.

The heating means is arbitrary and may be an electric heater, gas-fired, or may employ charcoal. Further, when the heating means is a dual surface heating type heating means where heat is generated from surfaces on mutually opposing sides, in appearance, it is possible to generate heat from the surfaces on mutually opposing sides by, for example, taking dual surfaces of plate-shaped members as heating surfaces by arranging electric heaters at both surfaces of the plate-shaped members or arranging a nozzle for spouting a gas flame, or by arranging an electric heater or a nozzle for spouting a gas flame at an internal space of a main member in the shape of a photograph frame.

Moreover, in one or more embodiments, when the cooking apparatus is equipped with a main apparatus body and a plurality of cassettes, a structure for installing the cassettes in the main apparatus body is arbitrary. For example, the main apparatus body may be taken to be a box with heating means arranged within the box. The cassettes then pass through an opening formed in the main apparatus body so as to be inserted into the main apparatus body in a freely removable manner. When all of the cassettes are inserted into the opening so as to be installed, the inside of the main apparatus body becomes a sealed space or a substantially sealed space.

In doing so, when all of the cassettes are inserted in the opening so as to be installed, the opening is covered by the cassettes so that the inside of the main apparatus body becomes a sealed space or a substantially sealed space. Heat from the heating means located within the main apparatus body can therefore be utilized in an effective manner for cooking the skewered food and thermal efficiency is improved.

When the cassettes can be installed in the main apparatus body in this manner, the opening may be provided at a perpendicular surface such as the front surface etc. of the main apparatus body or may also be provided at a horizontal surface such as the upper surface.

Further, this opening may be provided for each cassette, or may be provided in common for a plurality of or all of the cassettes.

In the above, in the description of where the inside of the main apparatus body becomes a sealed space or a substantially sealed space when all of the cassettes are inserted into the opening so as to be installed, it is understood that it is advantageous for gaps or holes etc. capable of allowing water vapor etc. coming from the skewered food being cooked by the heating means to escape to the outside to be provided at the main apparatus body and between the main apparatus body and the cassettes.

An apparatus for cooking food on skewers of the present invention also comprises a main apparatus body, at least one cassette provided with holding members for holding food on skewers, and rotating means for rotating the holding members. Here, a cooking space for cooking the food is formed within the main apparatus body. An opening causing the cooking space and the outside of the main apparatus to communicate and enabling extraction and insertion for installing the cassette is formed in the device body. The cooking space then becomes a sealed or substantially sealed space when the cassette is inserted so as to be installed at the opening.

According to this cooking apparatus, an opening causing the cooking space formed within the main apparatus body and the outside of the main apparatus to communicate and enabling the cassette to be inserted in a freely removable manner so as to be installed is formed at the main apparatus body so that when the cassette is inserted in this opening so as to be installed, the cooking space is sealed or substantially sealed. Therefore, when the cassette is inserted into the opening after a skewer skewering the food is held by the holding member provided at the cassette, the food is cooked in a cooking space that is a space which is sealed or substantially sealed. Because of this, cooking space becomes the same as or substantially the same as a heat storage space for cooking the food while storing heat from the heating means for cooking. As a result, the skewered food can be cooked while effectively utilizing heat from the heating means.

In order to utilize heat from the heating means at the cooking space still more effectively and improve thermal efficiency, there may be provided a member forming the cooking space such as, for example, a thermal insulator on the inside of a member forming an inner surface of the main apparatus body and a reflecting member or reflecting film with high optical reflectance may be provided on the inside surface side of the thermal insulator.

The opening for inserting and installing the cassette may be formed at an arbitrary location, and may be formed at a perpendicular surface such as the front of the main apparatus body, or may be formed at a horizontal surface such as the upper surface, and the shape of the main apparatus body is also arbitrary.

In one or more of the embodiments, heating means for cooking the food may be located at the main apparatus body or at the cassettes.

The type of heating means is also arbitrary, and examples may be an electric heater, a gas-fired heater, or a charcoal heater.

Further, the shape and structure of the cassette is also arbitrary, and the cassette may be long lengthways or sideways.

Moreover, in one or more of the embodiments, it is preferable to provide a juice receiving member for receiving juice created during cooking of the food at a position at a lower side from the supporting member for the cassette.

When a juice receiving member is provided at the cassette in this manner, juice created during cooking of the food can be received by the juice receiving member, and when the cassette is taken out from the opening, the juice can also be taken out from the cooking space and can therefore be handled easily.

Further, one cassette may be provided, or a plurality of cassettes may be provided.

In one or more of the embodiments, when the number of cassettes is taken to be a plurality, the cooking space may be used in common by all of the cassettes or by pluralities of the cassettes. Alternatively, the same number of cooking spaces and cassettes may be provided, or the cooking space may be partitioned into non-continuous partitioned spaces.

In one or more of the embodiments, the number of cooking spaces is taken to be a plurality that is the same number as the number of cassettes. When the respective cooking spaces are then partitioned so as to give non-continuous partitioned spaces, heating means may be provided at the main apparatus body for each cooking space, or may be provided for each cassette.

When heating means are provided for each cooking space or for each cassette, thermal transmission is suppressed because of the non-continuous partitioned space, and it is possible to set cooking temperature at the respective cooking spaces accurately or substantially accurately. Further, these cooking spaces do not communicate with each other. Therefore, even if the type of food cooked in the respective cooking spaces is different, while it is possible to cook these foods, smells from certain foods are prevented from going on to other foods.

In one or more of the embodiments, the number of cassettes is a plurality, and when a cooking space that is a partitioned space is provided for each of these cassettes within the main apparatus body, the cooking spaces may be lined up at the main apparatus body in a direction from left to right, in other words, in a widthwise direction, and at least two cooking spaces of these cooking spaces may be provided at the main apparatus body with a vertical positional relationship.

Accordingly, at least two cassettes are installed at the main apparatus body overlaid vertically. The widthwise dimensions of the cooking apparatus can therefore be made smaller by this amount, and as a result, the cooking apparatus can be arranged easily in the limited space of a kitchen.

Further, when a plurality of cassettes are provided, the opening may be used in common by all of these cassettes or by pluralities of these cassettes, or an opening may be provided for each cassette.

In one or more of the embodiments, as described previously, heating means provided each cooking space or each cassette may not be capable of adjusting cooking temperature or may be capable of individually adjusting cooking temperature.

When heating temperatures of the respective heating means are adjustable, it is possible for various foods requiring different quantities of heating for cooking to be finished in respective cooking spaces, and for these foods to be cooked completely at the same time or at substantially the same time.

Further, in one or more embodiments, the whole of the main apparatus body may be formed of transparent members, or a see-through part may be provided at the main apparatus body so as to make it possible to view the cooking space within the main apparatus body with the cassettes inserted in the opening from outside of the main apparatus body.

According to the latter, even when the cooking space is a sealed space or a substantially sealed space during cooking as described above, it is possible to confirm the cooking of food in the cooking space via the see-through window, and in the case of cooking apparatus used in a store, it is possible for a customer to view the cooking of the food in the cooking space.

The rotational drive sources of the rotating means for rotating the supporting members for holding the skewers of skewering the food may be located at the cassettes or may also be located at the main apparatus body. When the cassettes are then inserted at the opening provided at the main apparatus body so as to be installed, fellow drive force transmission means located at the main apparatus body and the cassette are connected, and drive force from the rotational drive sources may be transmitted to the supporting members.

In order to achieve the aforementioned advantages, a cooking apparatus for cooking skewered food constituted by food and a skewer skewering the food comprises a main apparatus body having a wall member forming a cooking space maintaining the food during cooking, a heater provided in such a manner that a heat-emitting section is positioned at an upper part of the cooking space, and a food holding mechanism for positioning food downwards from the heat-emitting section and being capable of holding horizontally laid skewers in a manner enabling free rotation about a center axis of the skewers.

In the above configuration, the wall member of the main apparatus body forms the cooking spaces where the food being cooked is held, and the heater is provided in such a manner that heat-emitting sections are positioned at upper parts of the cooking spaces and the food holding mechanism is capable of positioning food down from the heat-emitting sections so as to support horizontal skewers in a manner freely rotatable about the axis of the skewers. Skewered food held so as to be freely rotatable about the axes of the skewers is then subjected to heat from the heat-emitting sections so as to be cooked in the cooking spaces formed by the wall member.

In one or more of the embodiments, the opening is provided at the front surface of the cooking space of the wall member and the main apparatus body has a door member for covering the opening.

According to the above configuration, the opening is provided at the side of the front of the cooking space of the wall member, and the door member covers the opening. The skewered food can therefore be introduced to and withdrawn from the cooking space from the front, and when the door member closes the opening, leakage of heat from within the cooking space through the opening is suppressed.

In one or more of the embodiments, the food holding mechanism may have a guide mechanism for passing skewered food held through the opening, and providing guidance in a free-moving manner between the cooking space and the outside.

In the above configuration, the guide mechanism for the food holding mechanism provides guidance in a free-moving manner between the cooking space and outside so as to pass skewered food held through the opening. It is therefore possible for the skewered food to be held outside of the cooking space and enter the cooking space.

In one or more of the embodiments the wall member may have at least a pair of side surface wall members, an upper surface wall member, a front surface wall member, and a back surface wall member, for the pair of side surface wall members to form side surfaces for both sides of the cooking space, for the upper surface wall member to form an upper surface of the cooking space, for the front surface wall member to form a part above the opening of the front surface of the cooking space, and for the back surface wall member to form a back surface of the cooking space.

As a result of this configuration, the pair of side surface wall members form side surfaces for both sides of the cooking space, the upper surface wall member forms an upper surface of the cooking space, and the front surface wall member forms above the opening for the front surface of the cooking space, and the back surface wall member forms a back surface of the cooking space. It is therefore possible to form an approximate six surface cooking space having an opening at a front surface.

In one or more of the embodiments, the wall member has a first ventilation hole communicating with the outside at an upper part of the cooking space.

In the above configuration, the first ventilation hole of the wall member communicates with the outside at an upper part of the cooking space. The atmosphere of the cooking space can therefore be replaced with fresh air.

In one or more of the embodiments, the wall member may have a first ventilation hole communicating with the outside at an upper part of the cooking space and a second ventilation hole communicating with the outside at a lower part of the cooking space. With the above configuration, the first ventilation hole of the wall member communicates with the outside at an upper part of the cooking space and the second ventilation hole communicates with the outside at a lower part of the cooking space. It is therefore possible for fresh air to enter the cooking space from one of the first ventilation hole or the second ventilation hole, the atmosphere filling up the cooking space can be expelled to outside from the other one of the first ventilation hole or the second ventilation hole, and the atmosphere of the cooking space can be circulated with fresh air.

In one or more of the embodiments, the food holding mechanism may have a holding member for holding one end of a skewer and a rotating mechanism for rotating the holding member about an axial center of the skewer.

In the above configuration, the holding member of the food holding mechanism holds the skewers at one end, and the rotating mechanism causes the holding members to rotate about the axial centers of the skewers. The skewered food held by the holding members is therefore rotated and the food is cooked in an even manner.

In one or more of the embodiments, the food holding mechanism may have a holding member for holding one end of a skewer and a rotating mechanism for rotating the holding member about an axial center of the skewer, and the holding member may have a rod member provided with a hole for one end of the skewer to plug into, and a branching member stood up with one end supported at the rod member, and extending along the skewer towards the side of the food.

In the above configuration, a hole into which one end of the skewer is inserted is provided at the rod member, a branching member extends towards the food along the skewer, stands up with an end being supported at the rod member, and the rotating mechanism causes the holding members to rotate about the axial centers of the skewers. When a skewer is then inserted into a hole provided on the rod member and skewered food supported by a holding member is rotated, a branching member prevents the food from sticking in one position, and the food is cooked in a uniform manner.

In one or more of the embodiments, the food holding mechanism may have a holding member for holding one end of a skewer and a rotating mechanism for rotating the holding member about an axial center of the skewer, and the holding member may have a rod member provided with a hole for one end of the skewer to plug into, and a pair of mesh members extending along the skewer supported at the rod member so as to sandwich the food from both sides.

With the above configuration, a hole for inserting one end of the skewer is provided at the rod member of the holding member, the pair of mesh members supported at the rod member extend along the skewer so as to sandwich the food from both sides, and the rotating mechanism causes the holding members to rotate about the central axis of rotate of the skewer. When the skewer is then inserted into the hole provided in the rod member and skewered food supported at the holding member is rotated, the pair of mesh members sandwich the food from both sides, and the food is cooked in a uniform manner.

In one or more of the embodiments, the main apparatus body may have a juice receiving member having a flat plate part positioned at the bottom of the cooking space inclined in one direction.

With the above configuration, the flat plate member of the juice receiving member is positioned at the bottom part of the cooking space and inclined in one direction. Juice dripping from the food is therefore received by the juice receiving member and is gathered in the direction of inclination.

In one or more of the embodiments, the main apparatus body may have a juice receiving member having a flat plate part positioned at the bottom of the cooking space and being capable of receiving liquid dripping from above, and a covering plate with a plurality of holes for covering the upper surface of the flat plate part.

With the above configuration, the flat plate part of the juice receiving member is positioned at the bottom part of the cooking space so as to be able to receive liquid dripping from above. The covering plate opened with a plurality of holes then covers the upper surface of the flat part and juice dripping from the food passes through the holes in the covering plate and is received by the juice receiving member.

In one or more of the embodiments, the wall surface of the wall member may be metallic.

With the above configuration, the wall surface of the wall member is metallic. The metallic wall members therefore store heat radiated from the heater and air within the cooking space is heated up.

In order to bring about the aforementioned advantages, a holding member for holding skewered food constituted by food and a skewer skewering the food for cooking comprises a rod member provided with a hole for one end of the skewer to plug into and a pair of mesh members extending along the skewer supported at the rod member and so as to sandwich the food from both sides.

In the above configuration, the hole for inserting one end of the skewer is provided at the rod member of the holding member, and the pair of mesh members supported at the rod member extend along the skewer so as to sandwich the food from both sides. When the skewer is then inserted into the hole provided at the rod member, the pair of mesh members sandwich the food from both sides, and the food is prevented from coming off from the skewer.

DETAILED DESCRIPTION

The following is a description with reference to the drawings of embodiments of the present invention. Portions that are common to each of the drawings are given the same numerals and duplicated descriptions thereof are omitted.

Figure 1:
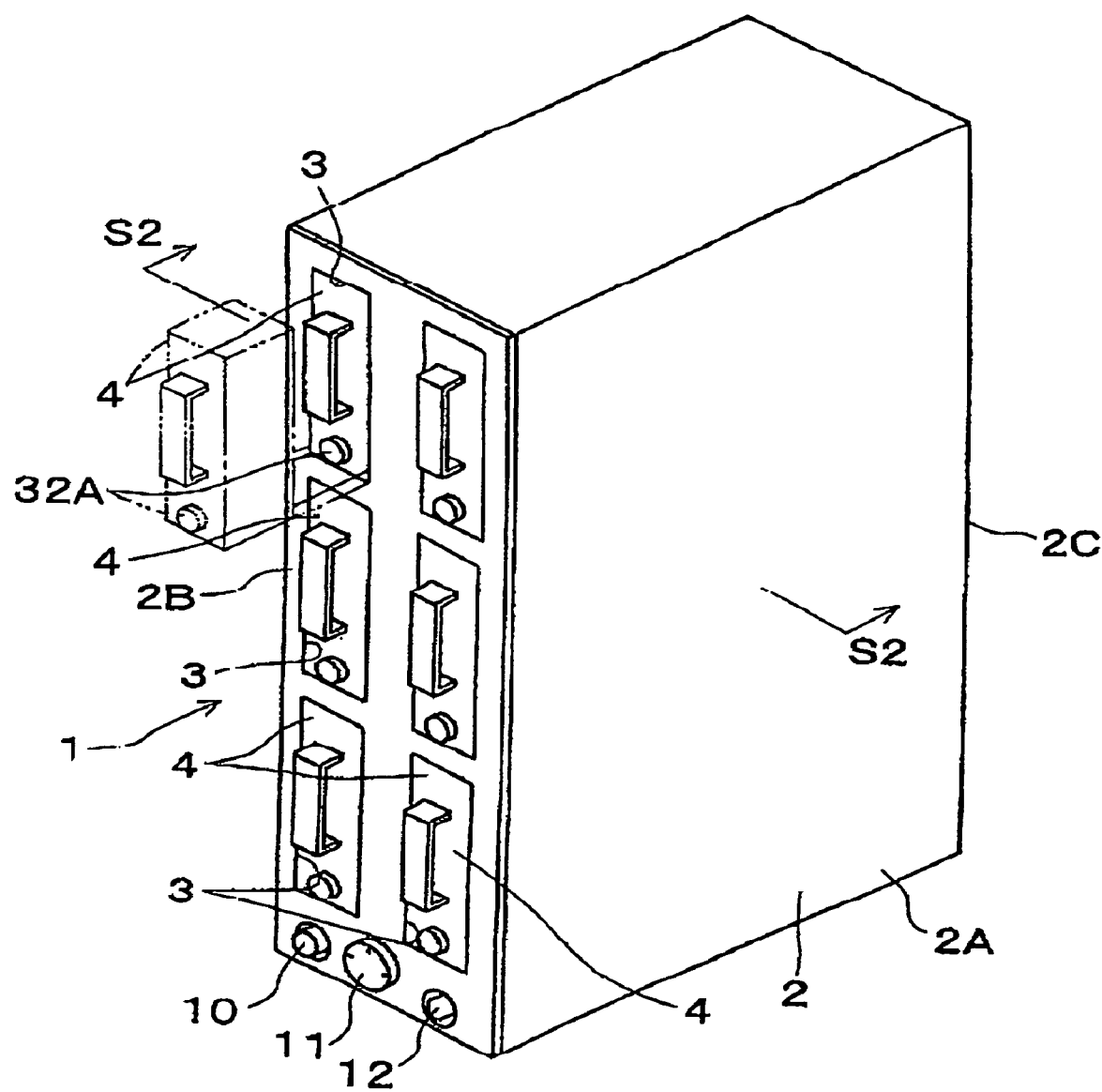
FIG. 1 is an overall perspective view of cooking apparatus of a first embodiment of the present invention.
Figure 2:
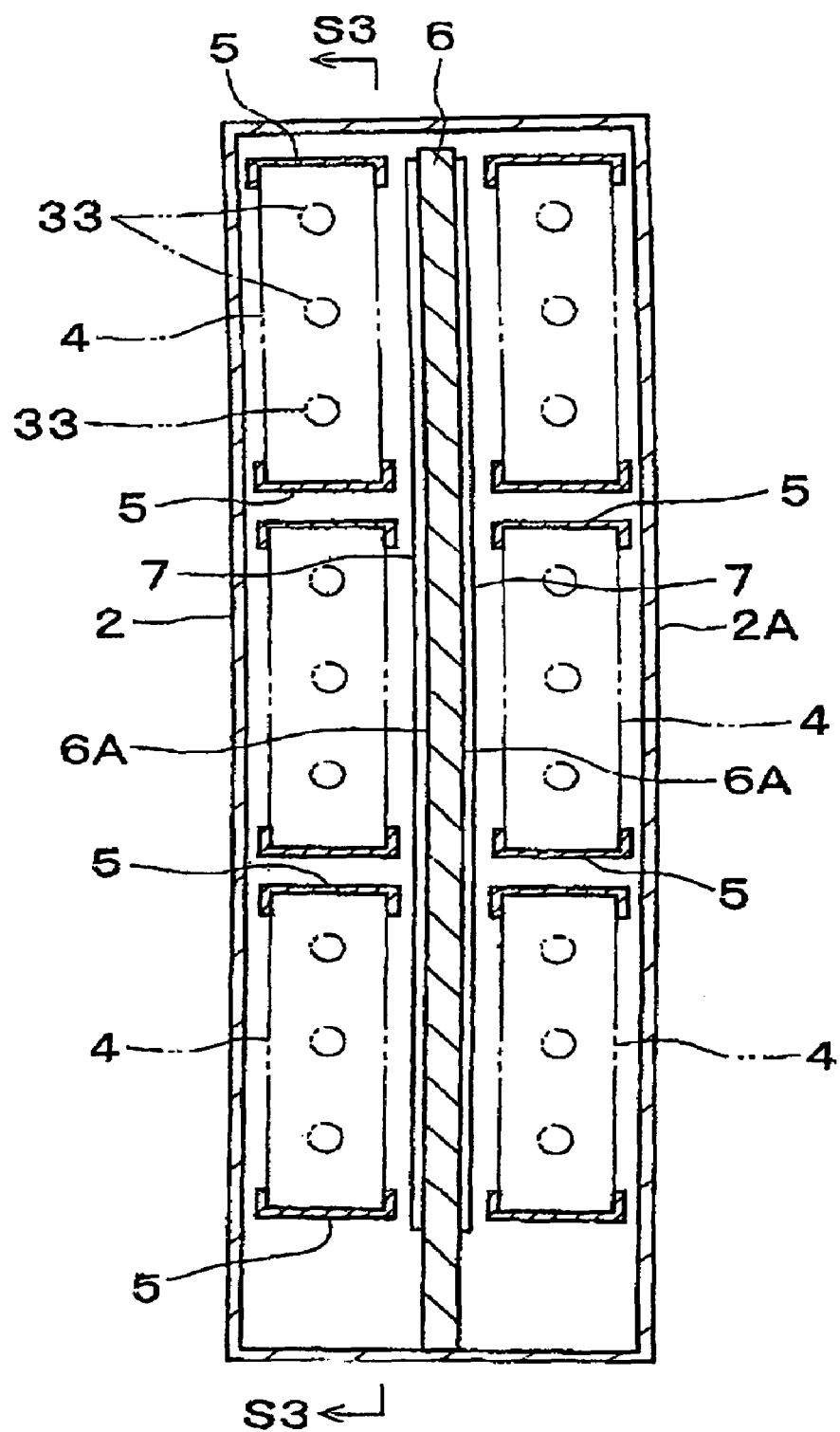
FIG. 2 is a cross-sectional view along line S2—S2 of FIG. 1.
Figure 3:
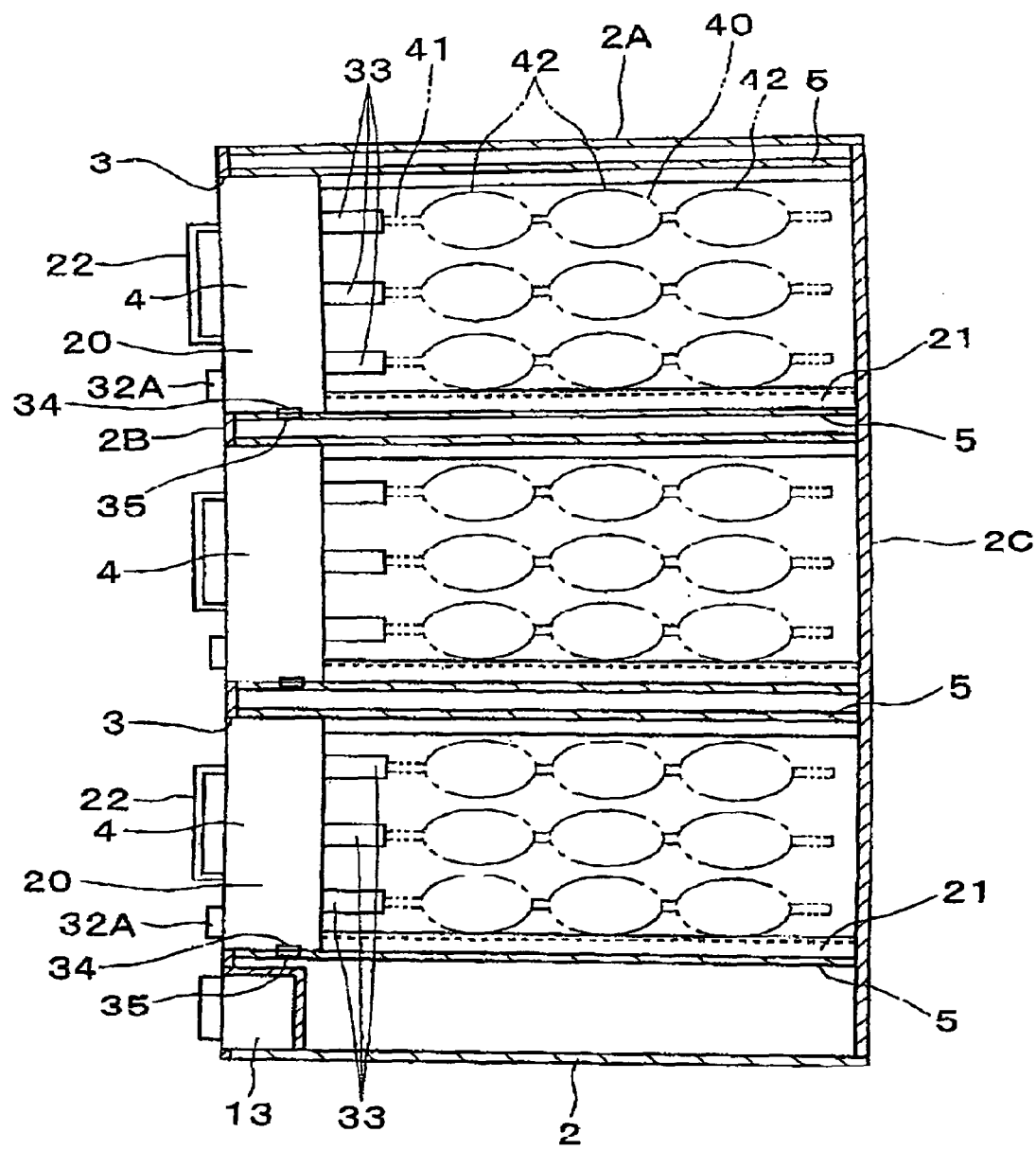
FIG. 3 is a cross-sectional view along line S3—S3 of FIG. 2.

First, a description is given based on the drawings of cooking apparatus of a first embodiment of the present invention. The cooking apparatus is, for example, an apparatus for cooking Japanese "yakitori" (food that is barbecued while skewered on a skewer) in a kitchen of a store. FIG. 1 is an overall perspective view of a cooking apparatus 1, FIG. 2 is a cross-sectional view taken along line S2—S2 of FIG. 1 showing the internal structure of the cooking apparatus 1, and FIG. 3 is a cross-sectional view taken along line S3—S3 of FIG. 2.

As shown in FIG. 1, the cooking apparatus 1 comprises a main apparatus body 2, and a plurality of cassettes 4 that can be freely inserted into and removed from the main apparatus body 2 through openings 3 formed in the main apparatus body 2. The cassettes 4 are installed in the main apparatus body 2 by inserting the respective cassettes 4 into the openings 3. The cassettes 4 can then be removed from the main apparatus body 2 by extraction from the openings 3. The main apparatus body 2 is a vertical oblong box having a square tube-shaped main member 2A and a front surface member 2B and back surface member 2C covering the front and back surfaces of the main member 2A, respectively.

A plurality of the openings 3 are formed in the front surface member 2B. The size and shapes of the openings 3 are the same. The size and shapes of the cassettes 4 are also the same. The structures of the cassettes 4 are also the same. As a result, it is possible to insert and install the cassettes 4 arbitrarily into arbitrary openings. In this embodiment, six openings 3 are provided in rows of 2 to the left and right, and rows of three vertically, with a total of six cassettes also being prepared.

Guide rails 5 are constructed at positions above and below the openings 3 between the front surface member 2B and the back surface member 2C of the main apparatus body 2. A cross-section of the guide rails 5 is a channel shape. The respective cassettes 4 are inserted from the openings 3 between pairs of upper and lower guard rails 5 and can be freely inserted into and removed from the main apparatus body 2 while being guided by the guide rails 5.

A plate-shaped standing wall 6 is arranged within the main apparatus body 2 and is erected from the bottom part of the main apparatus body 2. An electric heater 7 is provided on either side of the standing wall 6. Both surfaces 6A of the standing wall 6 therefore constitute heat-emitting surfaces. The cassettes 4 inserted through the openings 3 so as to be installed in the main apparatus body 2. Two sets of three of the cassettes 4 are therefore lined up vertically at positions facing the each one of the heat emitting surface 6A so that a total of six of the cassettes 4 are installed at the heat emitting surfaces 6A.

A power switch 10 for connecting and disconnecting a supply of electricity from a commercial power supply to the main apparatus body 2, a timer 11, and a lamp 12 that flashes when a time set using the timer 11 has elapsed are arranged at the lower part of the front surface of the main apparatus body 2. A power unit 13 equipped with the power switch 10, timer 11 and lamp 12 is incorporated within the lower part of the main apparatus body 2. A control circuit for electrically operating the cooking apparatus based on an "on" operation of the power switch 10 (described later) or a time setting of the timer 11 etc. is also provided at the power unit 13. The lamp 12 lights up when both the "on" operation of the power supply switch 10 and the time setting of the timer 11 are implemented.

Figure 4:
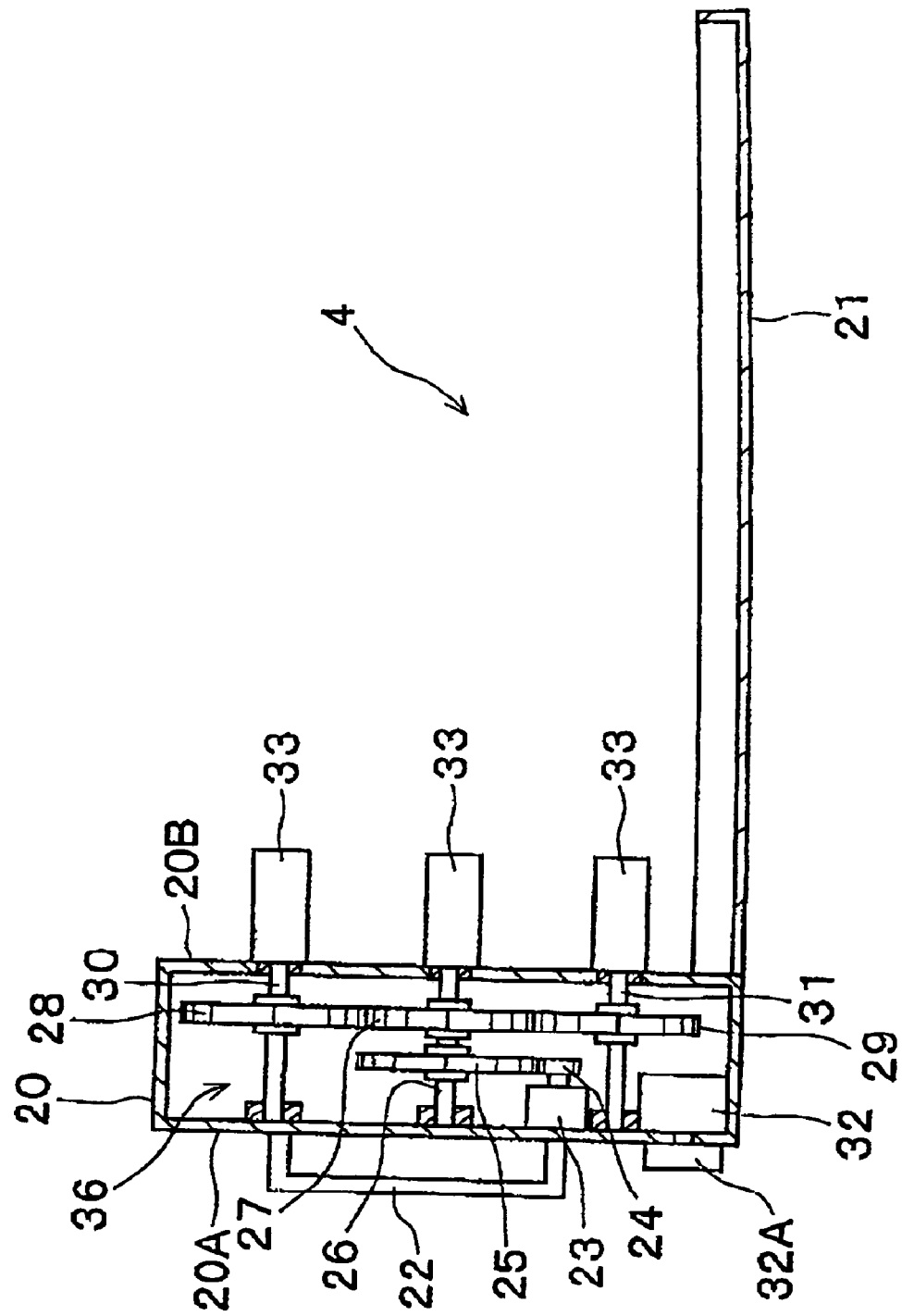
FIG. 4 is a side cross-sectional view of a cassette of a cooking apparatus of the first embodiment of the present invention.

FIG. 4 is a side cross-sectional view of cassette 4. The cassettes 4 comprise a box part 20 provided at a front part in the direction of withdrawal from the main apparatus body 2 and a juice receiving member 21 extending rearwards from the lower part of the back surface of the box part 20. A handle 22 is fitted to the front surface 20A of the box part 20. The cassettes 4 can then be inserted and removed into and out of the main apparatus body 2 by taking hold of the handle 22. An electric motor 23 constituting a rotational drive source, a small diameter gear 24 fixed to a drive shaft of the motor 23, a large diameter gear 25 meshing with the small diameter gear 24 and transmitting with reduced drive force of the motor 23, a transmission gear 27 fitted to a rotating shaft 26 to which the large diameter gear 25 is fixed, two driven gears 28, 29 having the same diameters as the transmission gear 27 and meshing with the transmission gear 27, and rotating shafts 30 and 31 to which the driven gears 28 and 29 are fitted are housed within the box part 20.

Further, a rotational speed regulator 32 for adjusting rotational speed of the electric motor 23 is arranged within the box part 20. A rotating dial 32A of the rotational speed regulator 32 is exposed at the front surface 20A of the box part 20. The rotational speed regulator 32 is a frequency modulator when the electric motor 23 is an alternating current motor, is a voltage regulator when the electric motor 23 is a direct current motor, and is a pulse number modulator when the electric motor 23 is a pulse motor.

The rear ends of the rotating shafts 26, 30 and 31 project from the rear surface 20B of the box part 20. Holding members 33 for holding skewers of "yakitori" are fitted at the rear ends of the rotating shafts 26, 30 and 31. The juice receiving member 21 is provided positioned to the lower side of the holding members 33 of a cassette 4.

Electrical contact points 34 are provided at the lower surfaces of the box parts 20 of the respective cassettes 4. Further, electrical contact points 35 are provided at the lower guide rails 5 of the pairs of upper and lower guide rails 5. When the cassettes 4 are inserted by a prescribed length within the main apparatus body 2 and the opening 3 is covered, the electrical contact points 34 and 35 make contact with each other. When the power switch 10 is turned on with the electrical contact points 34 and the electrical contact points 35 in a state of contact, electricity is supplied from a commercial power supply into which a plug of a lead (not shown) extending from the main apparatus body 2 is plugged to the power unit 13, and is supplied to the electric motor 23 of the cassette 4 via the electrical contact points 34 and 35 connected using electrical wiring with the power unit 13. The electric motor 23 rotates at a speed set using the rotational speed regulator 32. The heater 7 of the standing wall 6 also then conducts electricity, and the electric heater 7 generates heat. When time set using the timer 11 has elapsed, conduction of electricity to the electric motor 23 and the electric heater 7 from the power unit 13 is halted, and the lamp 12 flashes so as to give notification that the time set using the timer 11 has elapsed. After this, when a time is set again using the timer 11, the lamp 12 lights up, and electricity is again supplied to the electric motor 23 and the electric heater 7 for the set time.

Figure 5:
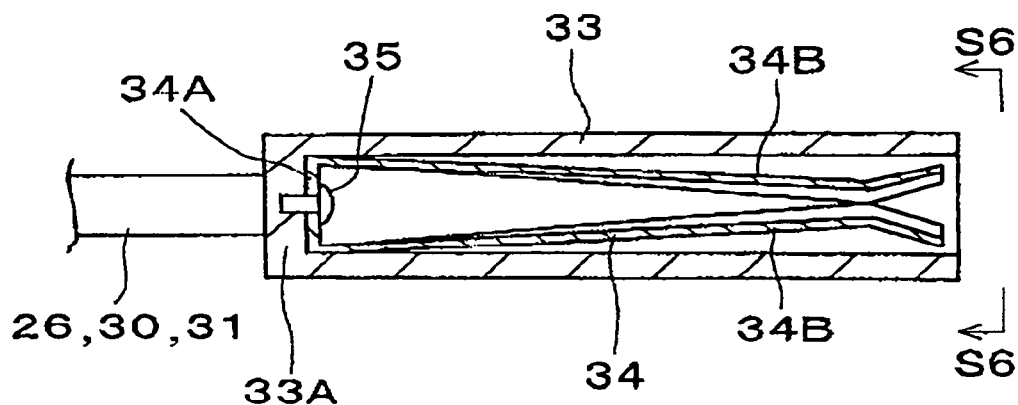
FIG. 5 is a side cross-sectional view of a supporting member of the cooking apparatus of the first embodiment of the present invention.
Figure 6:
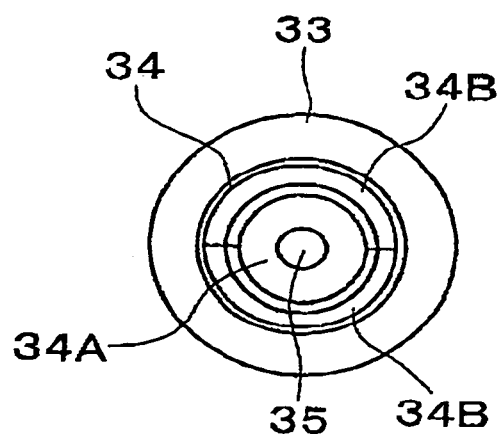
FIG. 6 is a view along line S6—S6 of FIG. 5.

FIG. 5 is a side cross-sectional view showing the internal structure of the holding members 33. FIG. 6 is a view along line S6—S6 of FIG. 5. The holding members 33 are cylindrical members opening in a direction to the rear in the direction of withdrawal from the main apparatus body 2 of the cassette 4. A sandwiching member 34 formed of plate springs is housed within the holding member 33.

The sandwiching member 34 comprises a base 34A coupled with a closed end part 33A of the holding member 33 using a coupling tool 35 such as a screw etc. and a pair of pinching claws 34B with an approximately round cross-section extending to the rear from the base 34A. The pinching claws 34B become closer to each other as they extend to the rear from the base 34A, and become gradually spaced apart from each other when extending from a location of closest proximity towards the rear.

When food 42 is skewered by a skewer 41 for the yakitori 40 and an end of this skewer 41 is inserted within a holding member 33, the pair of pinching claws 34B having resilience hold the skewer 41. When the skewer 41 is pulled out, the skewer 41 can be taken away from the pinching claws 34B, and the yakitori 40 can be extracted from the holding member 33.

Next, a description is given of the operation and workings of the cooking apparatus 1 of the first embodiment. When a cook of a store is to cook yakitori 40 according to an order from a customer, first, all of the cassettes 4 are extracted from the main apparatus body 2. Ends of skewers 41 of yakitori 40 skewering food 42, prepared in advance, are then inserted into the holding members 33 of the cassettes 4. Skewers 41 skewering the same type of food 42 are held at the holding members 33 of the same cassette 4. Namely, by holding the skewers 41 for food 42 for which the intrinsic cooking time is the same in holding members 33 of the same cassette 4, the food 42 is installed in the same cassette 4.

Next, the rotating dials 32A of the rotational speed regulators 32 provided at each cassette 4 are operated for each cassette 4, and the rotational speed of the electric motors 23 of each of the cassettes 4 is adjusted. The rotational speed is very slow for cassettes 4 containing food 42 such as gizzard, liver, or neck muscle (kashira) for which the intrinsic cooking time is relatively long. The rotation speed is fast for cassettes 4 containing ground chicken balls (tsukune), skin, or small intestine (shiromotsu), for which the intrinsic cooking time is relatively short. Cassettes 4 containing thigh meat or breast meat for which the intrinsic cooking time is a time lying somewhere between these times then has a rotational speed lying between these speeds.

After this, the cassettes 4 are inserted into the openings 3 so as to be installed within the main apparatus body 2. The electrical contact points 34 and the electrical contact points 35 then make contact with each other. The electric heater 7 is arranged on either side of the standing wall 6. The cassettes 4 are then arranged so as to be positioned facing the heat emitting surfaces 6A of the standing wall 6 constituting dual surface heat-emitting heating means.

Next, the time is set using the timer 11, and the power switch 10 is turned on. The time set using the timer 11 is decided by the rotational speeds of the electric motors 23 set using the rotational speed regulators 32 of the cassettes 4. The time is taken to be the time expected to be taken for the food 42 of the yakitori 40 installed at the cassettes 4 to finish cooking.

When the power switch 10 is turned on, the lamp 12 lights up, and rotating means 36 cause the holding members 33 of the respective cassettes 4 to rotate. The axial directions of the axial centers of rotation of the holding members 33 are parallel with the heat emitting surfaces 6A of the standing wall 6. The whole of the food 42 of the yakitori 40 held by the respective holding members 33 therefore passes in sequence at the heat emitting surfaces 6A due to the rotation of the holding members 33 and is cooked by heat from the heat emitting surfaces 6A.

Further, the juice receiving members 21 are provided at a position below the holding members 33 of the cassettes 4. Therefore, even if juice created during cooking falls down when cooking the food 42 of the yakitori 40, the juice is received by the juice receiving members 21.

When the time set at the timer 11 elapses, the supply of current to the electric motors 23 of the cassettes 4 and to the electric heater 7 is halted and the lamp 12 flashes.

The cook extracts the cassettes 4 from the openings 3 of the main apparatus body 2, the skewers 41 for the yakitori 40 are removed from the holding members 33 of the cassettes 4, and the yakitori 40 is put on a plate and taken to the customer making the order. After this, the power switch 10 is turned off. Further, when the following yakitori 40 is then cooked, after inserting and holding the skewers 41 of the yakitori 40 in the holding members 33 of the cassettes 4, the cassettes 4 are inserted into the openings 3 so as to be installed in the main apparatus body 2, the time for the timer 11 is set, and the power supply switch is turned on.

As described above, according to the cooking apparatus of the first embodiment, the holding members 33 of the cassettes 4 are rotated by the electric motors 23 provided at each cassette 4, and the rotational speed of the motors 23 can be adjusted using the rotational speed regulator 32. The supporting members 33 of the cassettes 4 are connected individually to the electric motors 23 that are separate from the cassettes 4. It is therefore possible to finish cooking all of the yakitori 40 at the same time or at substantially the same time by installing yakitori 40 of food 42 for which the intrinsic cooking time is different in separate cassettes 4 according to the type of food 42 and making the rotational speeds of the electric motors 23 of the cassettes 4 speeds corresponding to the type of food 42 of the yakitori 40 installed at these cassettes 4.

The rotational drive sources provided at each cassette are electric motors 23 for which the rotational speed can be adjusted. It is therefore possible to finish cooking all of the yakitori 40 still more accurately at the same time or at substantially the same time by adjusting the rotational speed of the holding members 33.

The total of six cassettes 4 are installed in the main apparatus body 2 in rows of two to the left and right and rows of three vertically, and two groups of three cassettes 4 of the six cassettes 4 are installed in the main apparatus body 2 with vertical positional relationships. It is therefore possible for the main apparatus body 2 to adopt a vertical oblong shape where the longitudinal dimension is greater than the widthwise direction. As a result, the cooking apparatus 1 can effectively utilize the limited space available in kitchens of stores.

It is also possible to insert and install arbitrary cassettes 4 at arbitrary openings because the openings 3 of the main apparatus body 2 into which the cassettes 4 are inserted are the same size and shape and the cassettes 4 themselves are also the same size and shape. The cooking apparatus 1 is therefore very convenient.

Moreover, because the structures of the cassettes 4 are the same, when a cassette 4 is damaged, it is possible to change this cassette 4 with a replacement cassette 4 simply by preparing a replacement cassette 4 in advance.

Further, the juice receiving members 21 are provided at positions below the holding members 33 of the cassettes 4. This means that even if juice is created during cooking from food 42 of yakitori 40 held by skewers 41 by the holding members 33 of the cassettes 4 on the upper side, this juice is received by the juice receiving members 21 and does not reach as far as cassettes 4 on the lower side. Juice therefore does not get onto food 42 of yakitori 40 being cooked by cassettes 4 on the lower side and the taste of the food 42 can be prevented from being changed.

The heating means 6 adopts a dual surface heat-emitting method where both surfaces constitute heat emitting surfaces 6A, the cassettes 4 are arranged at positions facing the respective heat emitting surfaces 6A, and the axial directions of the central axes of rotation of the holding members 33 of the cassettes 4 are in a direction parallel with the heat emitting surfaces 6A. The yakitori 40 installed at the plurality of cassettes 4 can therefore be cooked using a single heating means 6 and it is possible to cook all of the food 42 of the yakitori 40.

The main apparatus body 2 is a box shape with the heating means 6 arranged within. The respective cassettes 4 can be freely inserted into and extracted from the main apparatus body 2 through the openings 3 formed in the main apparatus body 2, and the inside of the main apparatus body 2 is a sealed space or a substantially sealed space when all of the cassettes 4 are inserted through the openings 3 so as to be installed. It is therefore possible to improve thermal efficiency when cooking the yakitori 40.

It is also possible to cover the inner surfaces of the main apparatus body 2 and the outer surfaces of the box part 20 of the cassette 4 with a thermal insulator, and to cover these surfaces with mirrored members such as stainless steel or silver foil etc. having high optical reflectance in order to further improve thermal efficiency.

It is also possible to have the power unit 13, with the power switch 10, timer 11 and lamp 12 as the electrical elements, provided in a control box separate from the main apparatus body 2, with the control box and the main apparatus body 2 then being connected using an electrical cable.

Further, the heat-emitting temperature of the heat emitting surfaces 6A of the heating means 6 adopting a dual surface heat-emitting method may also be the same or different. If they are different, in combination with adjustment of the rotational speed of the holding members 33 by the electric motor 23, it is then possible to cook a still wider variety of food 42 for which the intrinsic cooking times are different.

Further, it is also possible to finish cooking a plurality of skewered food for which the intrinsic cooking time is different at the same time or at substantially the same time.

Figure 7:
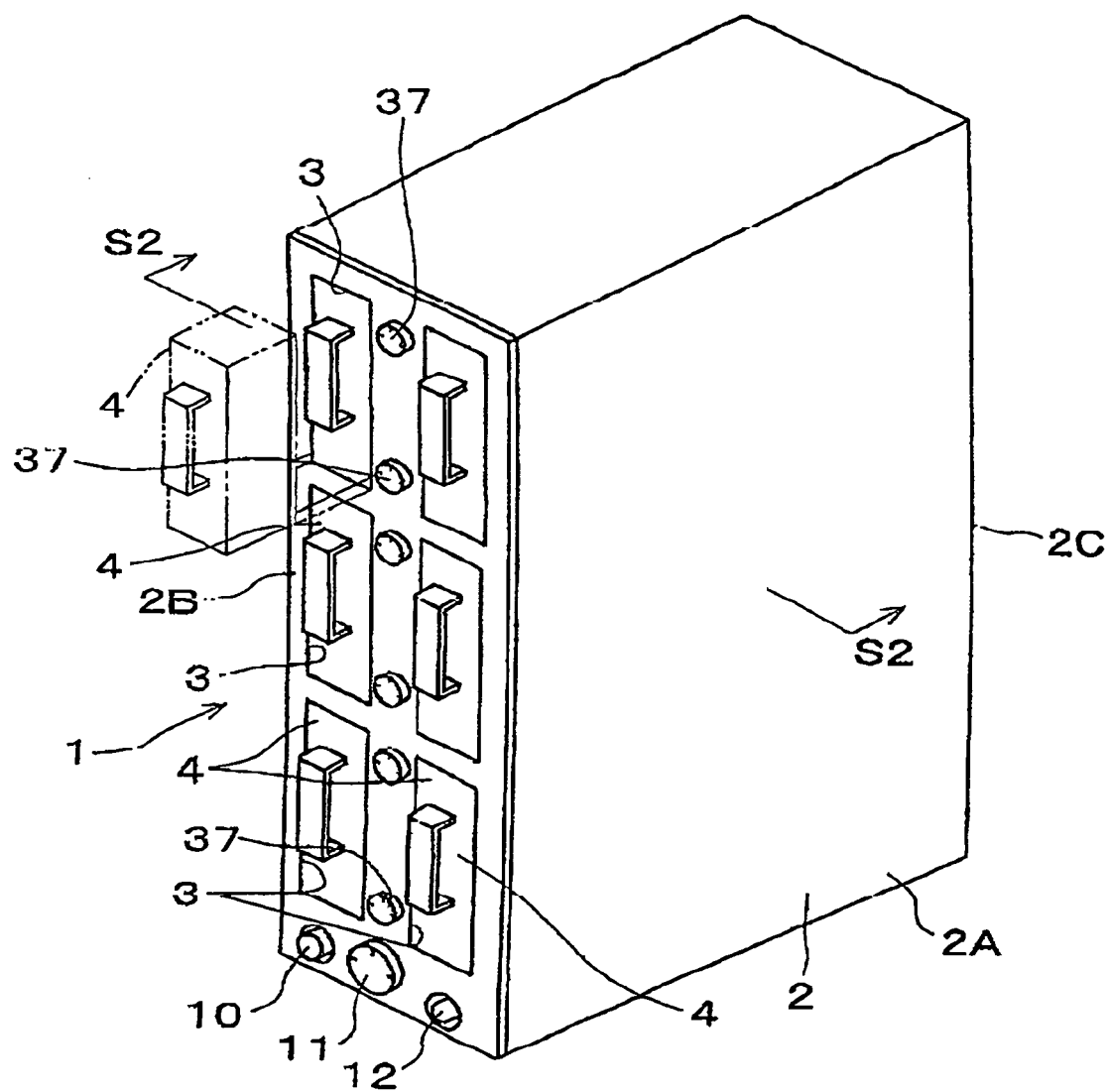
FIG. 7 is an overall perspective view of cooking apparatus of a second embodiment of the present invention.
Figure 8:
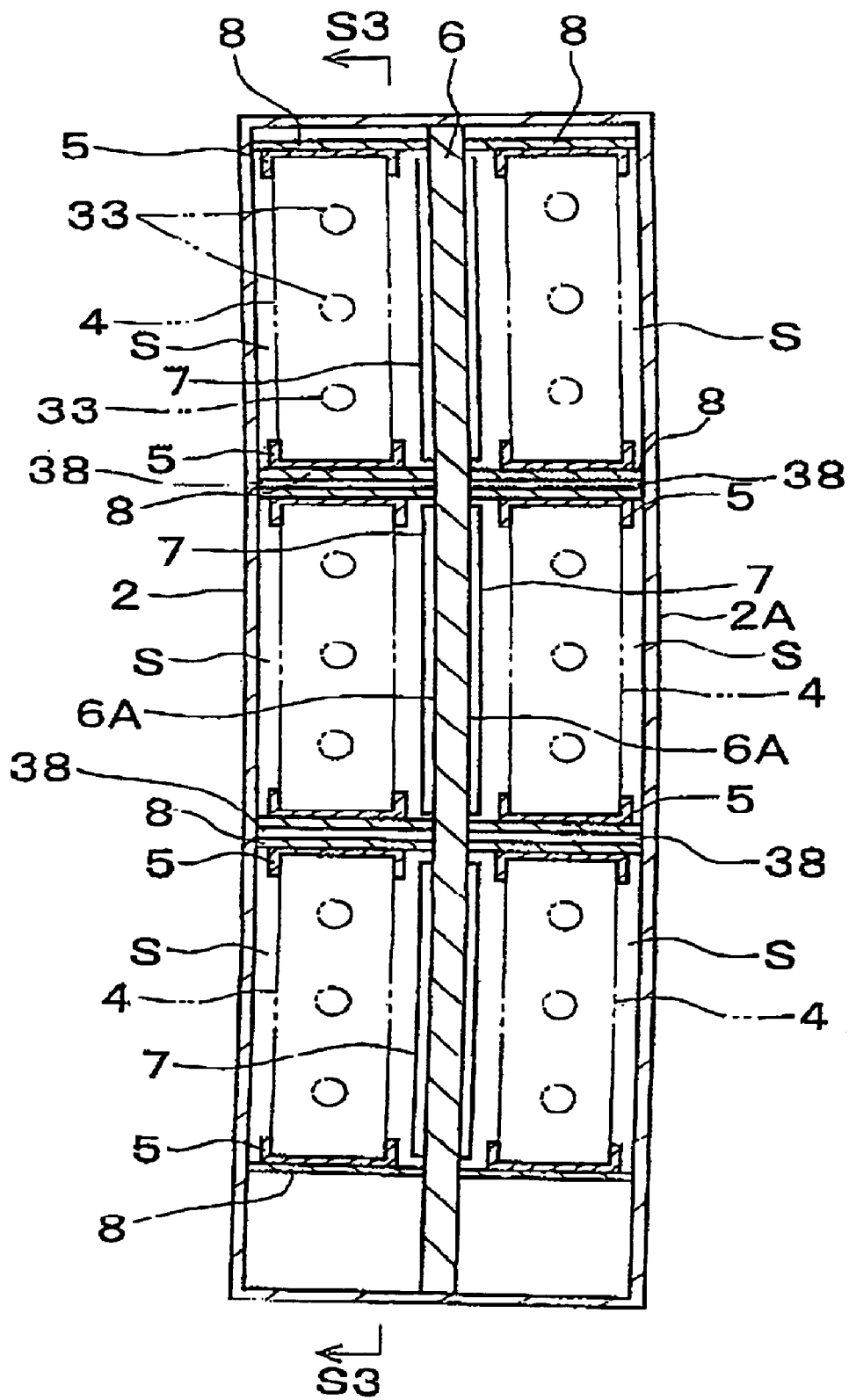
FIG. 8 is a cross-sectional view along line S2—S2 of FIG. 7 of the internal structure of the cooking apparatus of FIG. 7.
Figure 9:
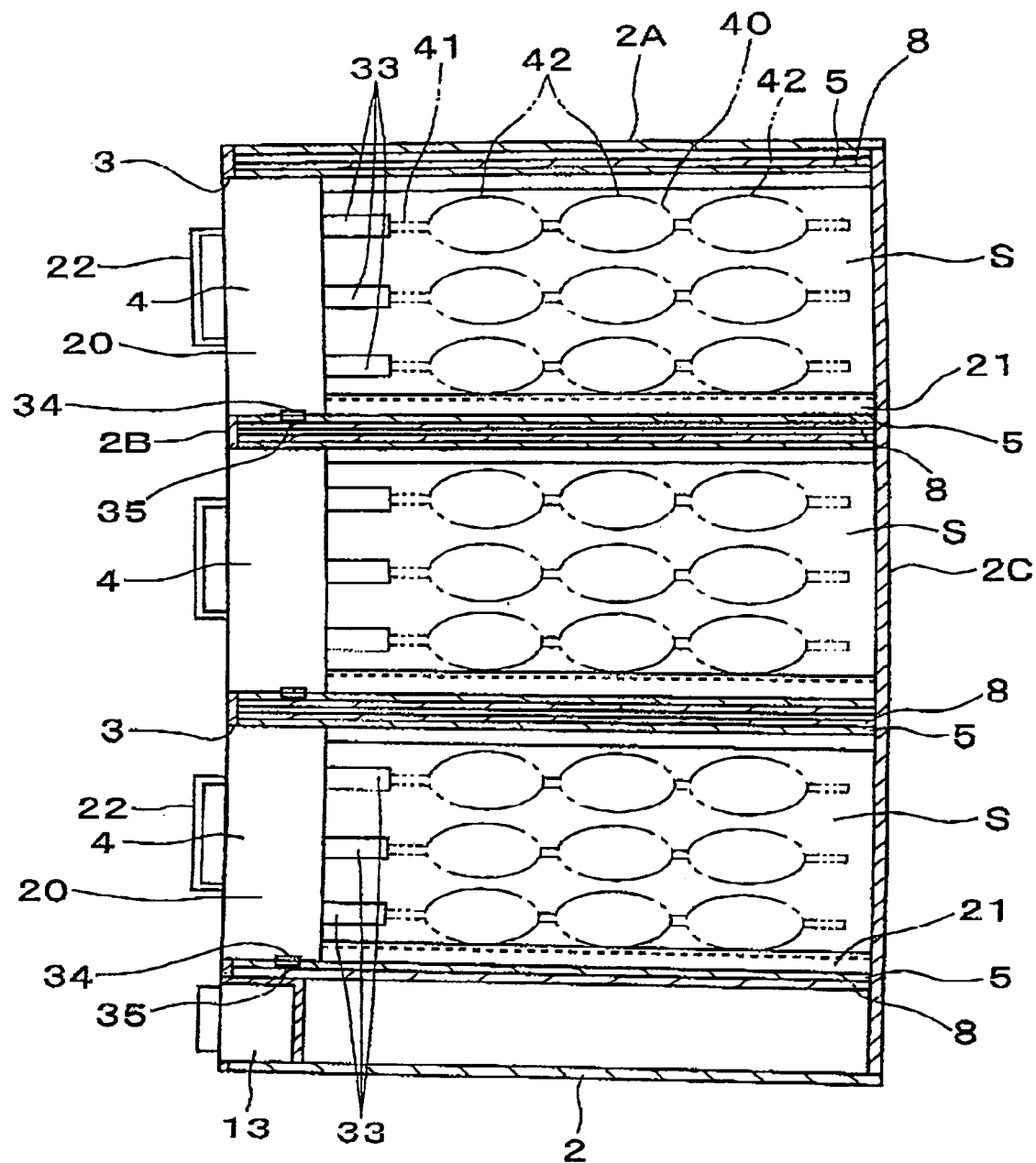
FIG. 9 is a cross-sectional view along line S3—S3 of FIG. 8.

Next, a description is given based on the drawings of a configuration for cooking apparatus of a second embodiment of the present invention. The cooking apparatus of the second embodiment is, for example, an apparatus for cooking Japanese "yakitori" (food that is barbecued while skewered on a skewer) in a kitchen of a store. FIG. 7 is an overall perspective view of a cooking apparatus 1, FIG. 8 is a cross-sectional view taken along line S2—S2 of FIG. 7 showing the internal structure of the cooking apparatus 1, and FIG. 9 is a cross-sectional view taken along line S3—S3 of FIG. 8.

The cooking apparatus 1 comprises a main apparatus body 2, and a plurality of cassettes 4 that can be freely inserted into and removed from the main apparatus body 2 through openings 3 formed in the main apparatus body 2.

The structure of the main apparatus body 2 is similar to the structure of the cooking apparatus of the first embodiment and portions that are the same are therefore omitted, with only different portions being described.

A standing wall 6 erected from the bottom part of the main apparatus body 2 as far as the ceiling of the main apparatus body 2 is located within the main apparatus body 2. The heaters 7 are provided on left and right surfaces 6A on opposite sides of the plate-shaped standing wall 6.

The pairs of upper and lower guide rails 5 for guiding the cassettes 4 are fitted at plate-shaped partitioning members 8 arranged horizontally within the main apparatus body 2. The partitioning members 8 are arranged to the left and right of the standing wall 6 according to the positions of the openings 3. One of each of the ends of the partitioning members 8 is coupled to the inner surface of the left or right side surface of the main apparatus body 2 and the other of each of the ends is coupled with the standing wall 6. The partitioning members 8 have lengths that run from the front surface member 2B of the main apparatus body 2 reaching as far as the back surface member 2C.

Cooking spaces S are formed as a result of the inside of the main apparatus body 2 being partitioned by the standing wall 6 and the partitioning members 8. The number of cooking spaces S is the same as the number of openings 3, in other words, the same as the number of cassettes 4. The cooking spaces S are sealed or substantially sealed spaces when the cassettes 4 are installed by insertion through the openings 3.

The electric heaters 7 taken as the heating means are arranged at both of the surfaces 6A of the standing wall 6, and are provided for each respective cooking space S. Cooking temperature regulators 37 for adjusting the temperatures of the electric heaters 7 are arranged at the front surface member 2B of the main apparatus body 2. The temperatures of the heaters 7 correspond to the cooking temperature for cooking the "yakitori" constituting skewered food. The cooking temperature regulators 37 for changing voltages for energizing the electric heater 7 are provided for each electric heater 7. The electric heaters 7 can have their temperatures adjusted individually.

Figure 10:
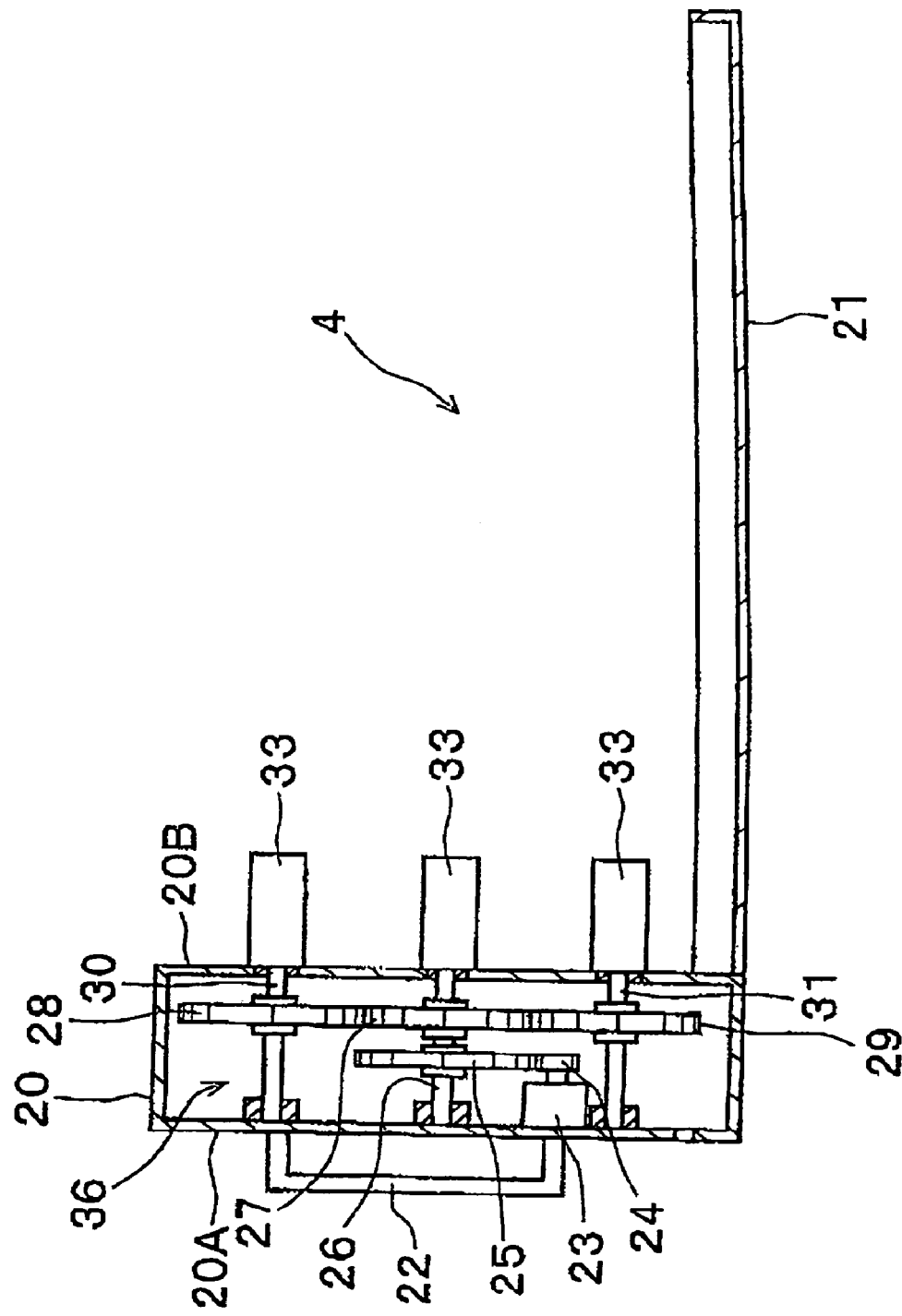
FIG. 10 is a side cross-sectional view of a cooking apparatus cassette of the second embodiment of the present invention.

FIG. 10 is a side cross-sectional view showing a cassette 4. The cassettes 4 comprise a box part 20 provided at a front part in the direction of withdrawal from the main apparatus body 2 and a juice receiving member 21 extending rearwards from the lower part of the back surface of the box part 20.

The cassette structure is the same compared to the structure for the cassettes of the cooking apparatus of the first embodiment with the exception that rotational speed regulators are not provided, and description thereof is therefore omitted. The holding members 33 therefore rotate at a rotational speed decided by a combination of the power supply frequency, the motors 23, and the gears.

In the following, a description is given of the operation and workings of the cooking apparatus 1 of the second embodiment of the present invention.

When a cook of a store is to cook yakitori 40 according to an order from a customer, the cooking apparatus 1 is operated in the following manner. First, all of the cassettes 4 are extracted from the main apparatus body 2, and ends of skewers 41 of yakitori 40 with skewered food 42, prepared in advance, are inserted into the holding members 33 of the cassettes 4, and held.

Next, the cassettes 4 are inserted into the openings 3 so as to be installed within the main apparatus body 2. As a result, the electrical contact points 34 and 35 make contact, and the cassettes 4 are positioned individually in respective cooking spaces S.

Next, the heating temperatures of the respective electric heaters 7 are set by the cooking temperature regulators 37, the time is set using the timer 11, and the power switch 10 is turned on. The heating temperature set for an electric heater 7 is taken to be a temperature corresponding to the type of food 42 of the yakitori 40 cooked in the cooking spaces S at which the particular electric heater 7 is located.

For example, when the food 42 is gizzard, liver, or neck muscle (kashira) for which a large amount of heat is required until the food is cooked due to the intrinsic cooking time required being long, a high cooking temperature is chosen for the cooking space S. Further, when the food 42 is ground chicken balls (tsukune), skin, or small intestine (shiromotsu) for which only a small amount of heat is required until the food is cooked due to the intrinsic cooking time required being relatively short, a low cooking temperature is chosen for the cooking space S. Further, when the food 42 is thigh meat or breast meat for which the intrinsic cooking time is a time somewhere in between, an intermediate temperature is chosen for the cooking space S.

The time set using the timer 11 is taken to be a time such that each type of food 42 on the yakitori 40 finishes cooking at the same time in all of the cooking spaces S due to the heating temperatures of the respective electric heaters 7 set using the cooking temperature regulators 37.

When the power switch 10 is turned on, rotating means 36 cause the holding members 33 of the respective cassettes 4 to rotate. The yakitori 40 then rotate, and the food 42 of the yakitori 40 is then cooked by heat from the electric heaters 7.

The juice receiving members 21 are provided positioned to the lower side of the holding members 33 of a cassette 4. If juice is created and falls down from the food 42 when the food 42 of the yakitori 40 is being cooked, the juice is received by the juice receiving member 21 and does not fall down further than the cassette 4.

The operation and workings after the time set using the timer 11 has elapsed are the same as the operation and workings of the cooking apparatus of the first embodiment and description thereof is therefore omitted.

The structure of a cooking apparatus of the second embodiment of the present invention described above brings about the following results.

When cooking spaces S for cooking the yakitori 40 are provided within the main apparatus body 2 and the cassettes 4 are inserted in the openings 3 so as to be installed, the cooking spaces S are closed or substantially sealed spaces. Heat from the electric heater 7 is stored or substantially stored at the cooking spaces S and the food 42 on the yakitori 40 is cooked. As a result, thermal efficiency is improved, heat is effectively utilized, and running costs for the electric heater 7 are reduced.

Further, juice coming from the food 42 of the yakitori 40 can be received by the juice receiving members 21 because the juice receiving members 21 are provided at positions on the lower sides of the holding members 33 of the cassettes 4. When the cassettes 4 are extracted from the main apparatus body 2, juice can also be extracted from the cooking spaces S, the juice can easily be disposed of, and treatment of the juice can easily be carried out.

It is also possible to cook yakitori 40 installed at a plurality of cassettes 4 at the same time because a plurality of cooking spaces S are provided within the main apparatus body 2. The cooking spaces S are non-continuous partitioned spaces. The influence cooking temperature in one cooking space S exerts on cooking temperature in another cooking space S can therefore be suppressed, and temperatures can be set for the respective cooking spaces S in an accurate or substantially accurate manner. Further, these cooking spaces S do not communicate with each other. Therefore, even if the type of food 42 cooked in the respective cooking spaces S is different, smells from certain foods 42 are prevented from going on to other foods 42.

Further, the six cooking spaces S are provided at the main apparatus body 2 in rows of two from left to right and in rows of three arranged vertically. It is therefore possible for the cooking apparatus 1 to have a small dimension in a widthwise direction constituting a direction from left to right and a large dimension in a vertical direction so as to be made vertical oblong in shape. It is therefore possible for the cooking apparatus 1 to effectively utilize the limited space available in the kitchen of a store.

Even when the cooking spaces S are provided within the main apparatus body 2 three at a time with a vertical relationship, the upper and lower cooking spaces S are partitioned. This means transmission of heat from a cooking space S on a lower side to an upper side cooking space S that causes the temperature of the upper side cooking space S to exceed the set temperature can be suppressed.

When an air layer 38 is provided between upper and lower cooking spaces S as a thermally insulating layer, heat from the lower side cooking space S is even more effectively prevented from being transmitted to the upper side cooking space S.

Moreover, electric heaters 7 are provided for each respective cooking space S within the main apparatus body 2 and the temperature of each electric heater 7 can be individually adjusted using the cooking temperature regulators 37. It is therefore possible to cook various types of food 42 requiring different quantities of heat to become cooked in the respective cooking spaces S, and the food 42 can therefore be cooked at the same or substantially the same time.

It is also possible to insert and install arbitrary cassettes 4 at arbitrary openings 3 because the openings 3 into which the cassettes 4 are inserted are the same size and shape and the cassettes 4 themselves are also the same size and shape and this makes the cooking apparatus 1 very convenient.

Moreover, because the structures of the cassettes 4 are the same, when a cassette 4 is damaged, it is possible to change this cassette 4 with a replacement cassette 4 simply by preparing a replacement cassette 4 in advance.

The power unit 13, with the electrical elements of the power switch 10, timer 11 and lamp 12, is provided in the main apparatus body 2, but may also be provided in a control box separate from the main apparatus body 2, with the control box and the main apparatus body 2 then being connected using an electrical cable.

Next, a description is given based on the drawings of a configuration for cooking apparatus of a third embodiment of the present invention.

Figure 11:
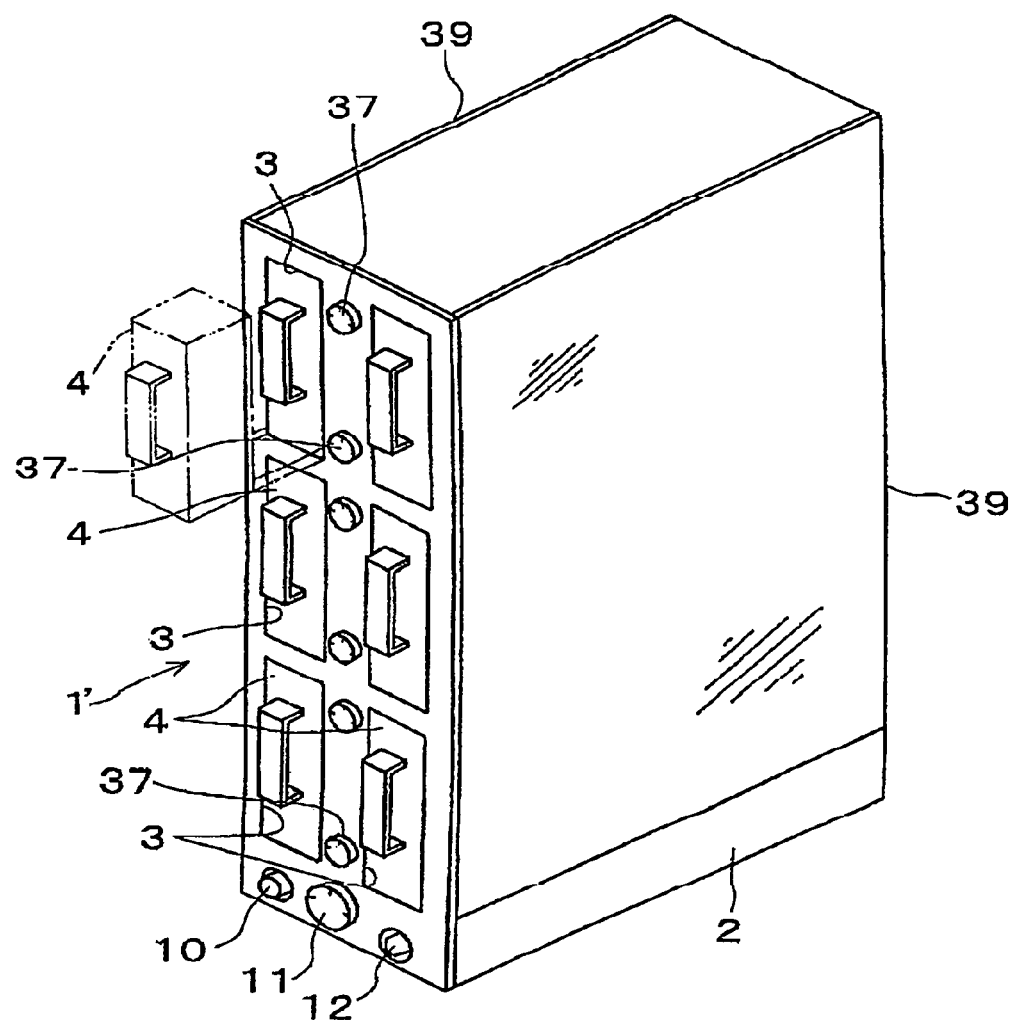
FIG. 11 is an overall perspective view of cooking apparatus of a third embodiment of the present invention.

FIG. 11 shows cooking apparatus 1' of a third embodiment. The structure of this cooking apparatus 1' is fundamentally the same as the structure of the cooking apparatus 1 of the second embodiment.

A part of the left and right side surfaces of the main apparatus body 2 of the cooking apparatus 1' is formed of a transparent member 39 consisting of transparent glass or transparent synthetic resin having heat-resistant properties. The transparent member 39 has the same surface area or substantially the same surface area as the entire range over which the cooking spaces S are provided within the main apparatus body 2. As a result, even if yakitori 40 is cooked within the respective cooking spaces S constituted by sealed spaces or by substantially sealed spaces, it is possible to see the cooked state of the yakitori 40 in the cooking spaces S from outside of the main apparatus body 2 by looking through the transparent member 39, and it is therefore possible for customers coming to the store to view the cooking state of the yakitori 40 in the cooking spaces S.

The transparent member 39 may be fitted to the main apparatus body 2 in a detachable manner. As a result, components such as smoke or oil etc. that may hinder the transparency of the transparent member 39 that may become attached as a result of cooking the yakitori 40 can be cleaned off and removed.

Next, a description is given based on the drawings of a configuration for cooking apparatus of a fourth embodiment of the present invention.

Figure 12:
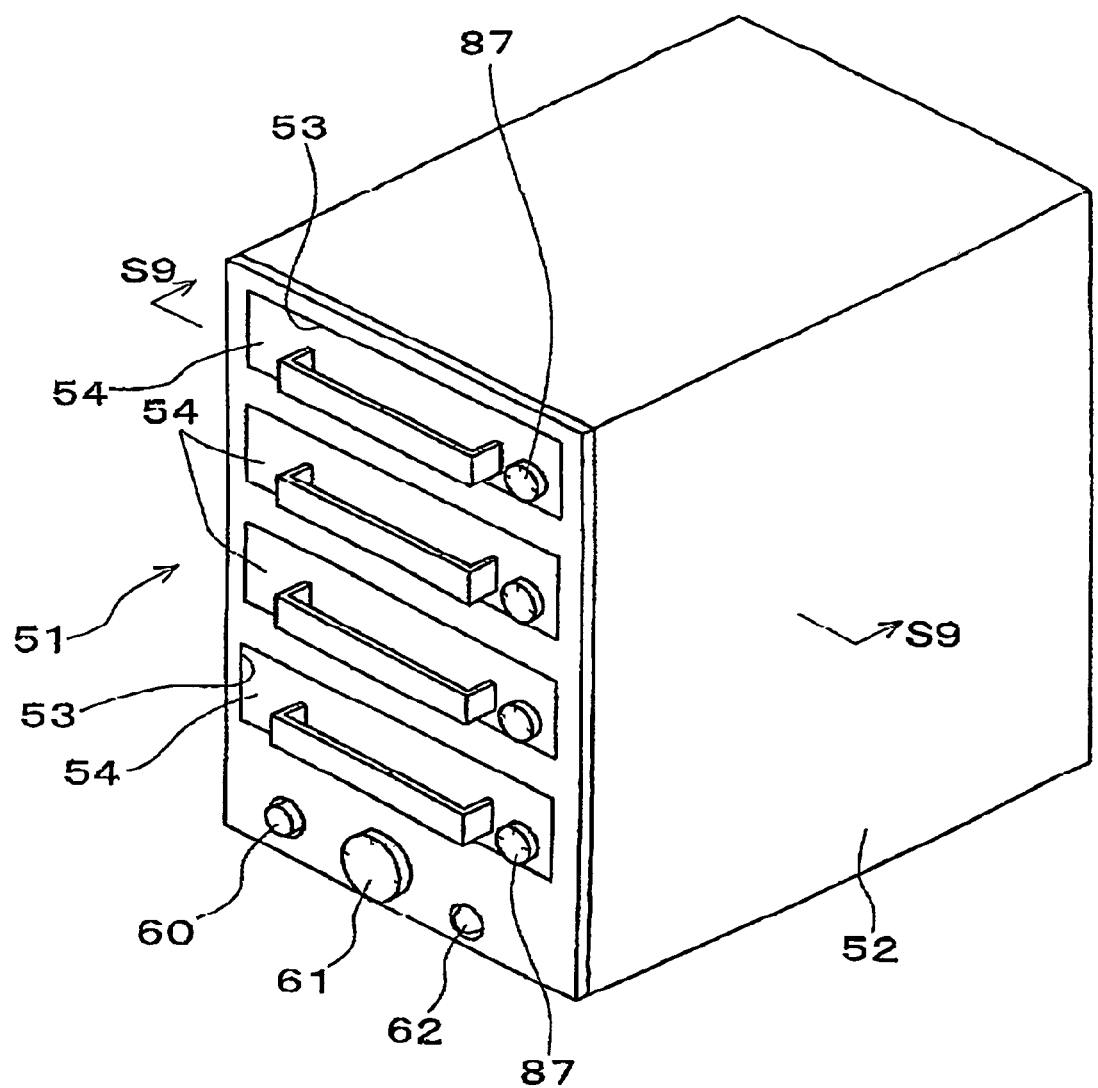
FIG. 12 is an overall perspective view of cooking apparatus of a fourth embodiment of the present invention.

FIG. 12 shows a yakitori cooking apparatus 51 of a fourth embodiment. Openings 53 into which the cassettes 54 are inserted are formed at a perpendicular front surface portion of a main apparatus body 52 of this cooking apparatus 51. Four openings 53 are provided lined up in a vertical manner. The respective openings 53 and cassettes 54 are vertical oblong with long dimensions in a horizontal direction.

Figure 13:
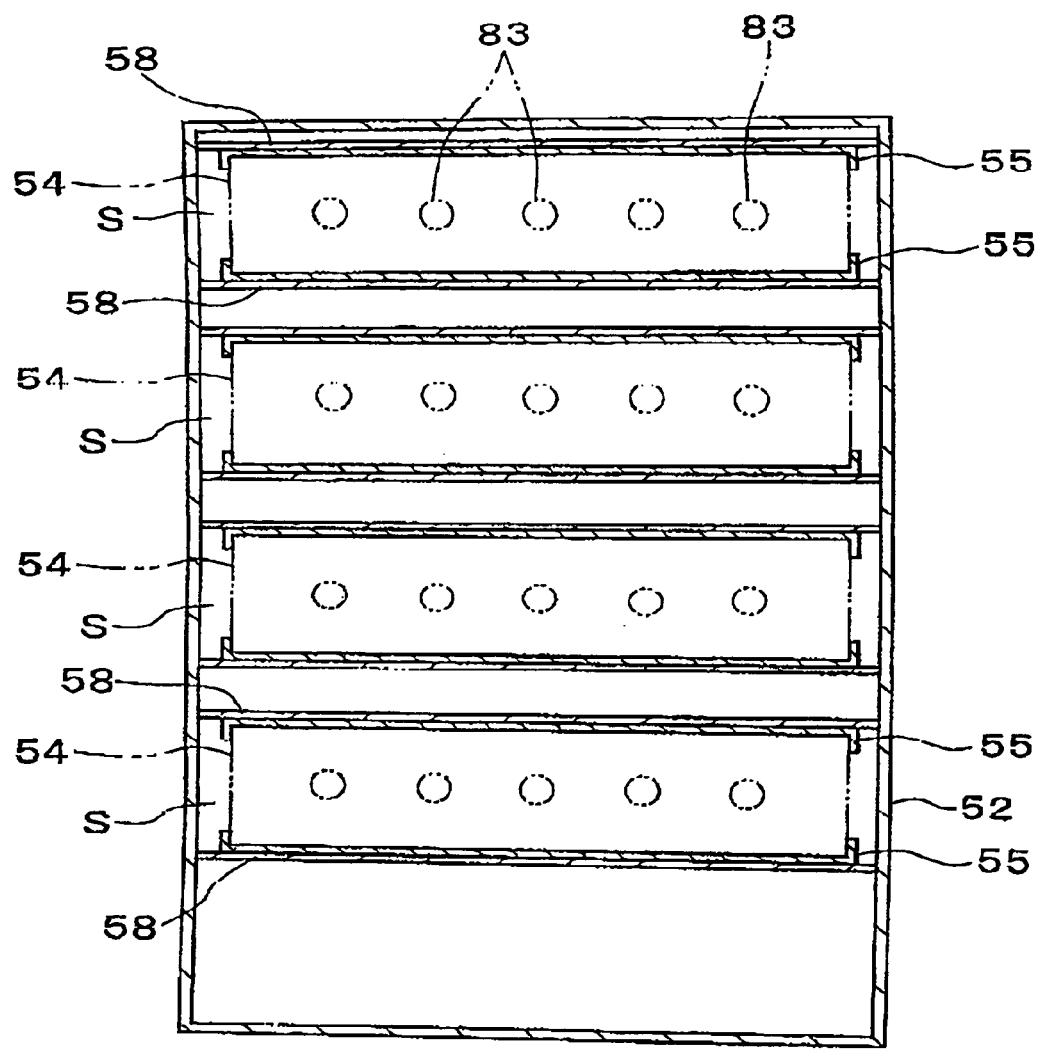
FIG. 13 is a cross-sectional view along line S9—S9 of FIG. 12.

FIG. 13 is a cross-sectional view along line S9—S9 of FIG. 12. The pairs of upper and lower guide rails 55 can be arranged within the main apparatus body 52. The cassettes 54 are guided by the guide rails 55 provided at each opening 53, and can be freely inserted and removed into and out of the main apparatus body 52. The guide rails 55 are fitted at plate-shaped partitioning members 58 arranged horizontally within the main apparatus body 2. The respective partitioning members 58 has a lengthwise dimension in a direction from front to rear from the front surface of the main apparatus body 52 to the back surface, and a widthwise dimension in a direction from left to right reaching both the left and right side surfaces of the main apparatus body 2.

The cooking spaces S partitioned so as to be discontinuous by the partitioning members 58 are formed so as to be lined up vertically within the main apparatus body 52. The number of cooking spaces S constituted by the partitioned spaces is the same as the number of openings 53, in other words, the same as the number of cassettes 54. The cooking spaces S are sealed or substantially sealed spaces when the cassettes 54 are installed by insertion through the openings 53.

Figure 14:
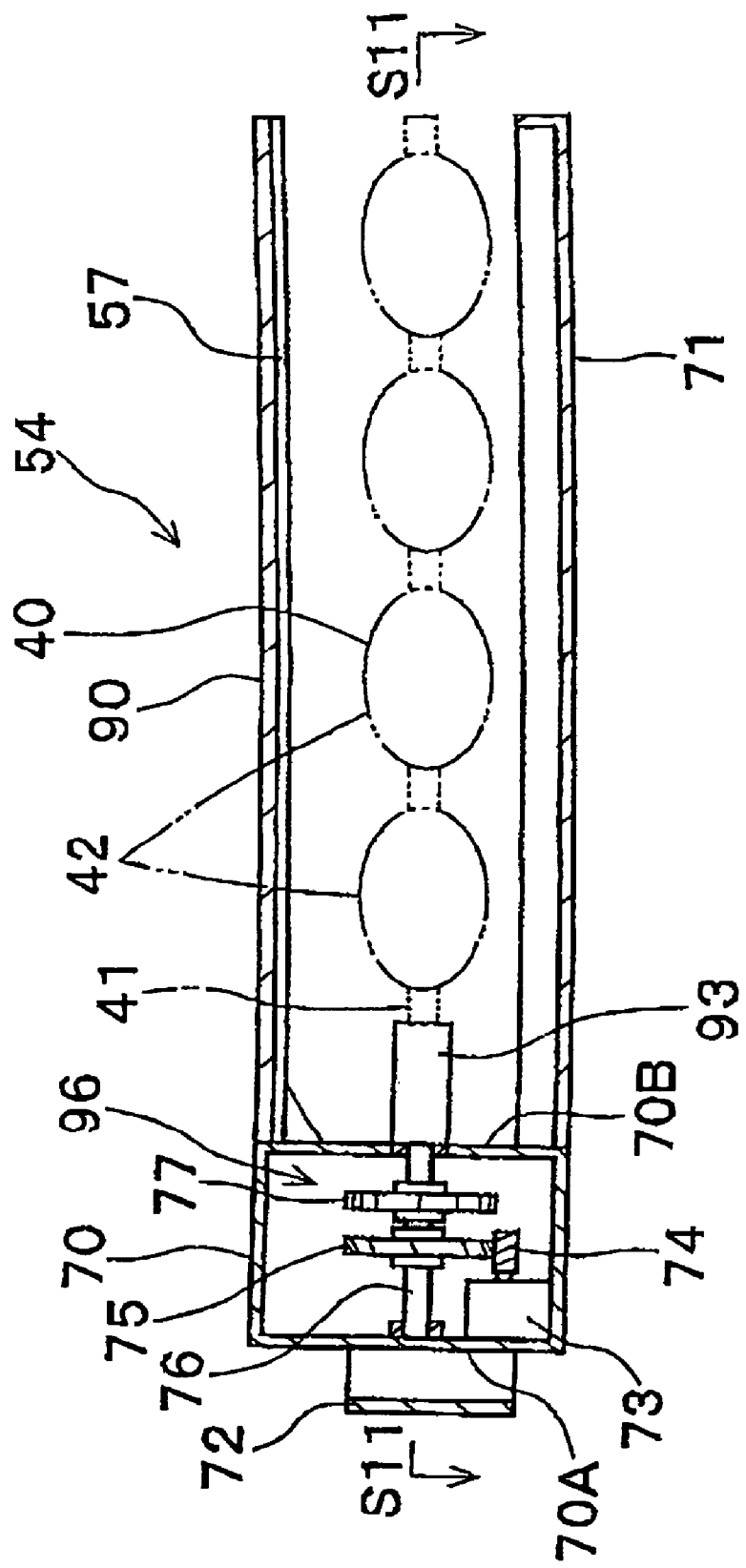
FIG. 14 is a side cross-sectional view of a cassette of a cooking apparatus of a fourth embodiment of the present invention.
Figure 15:
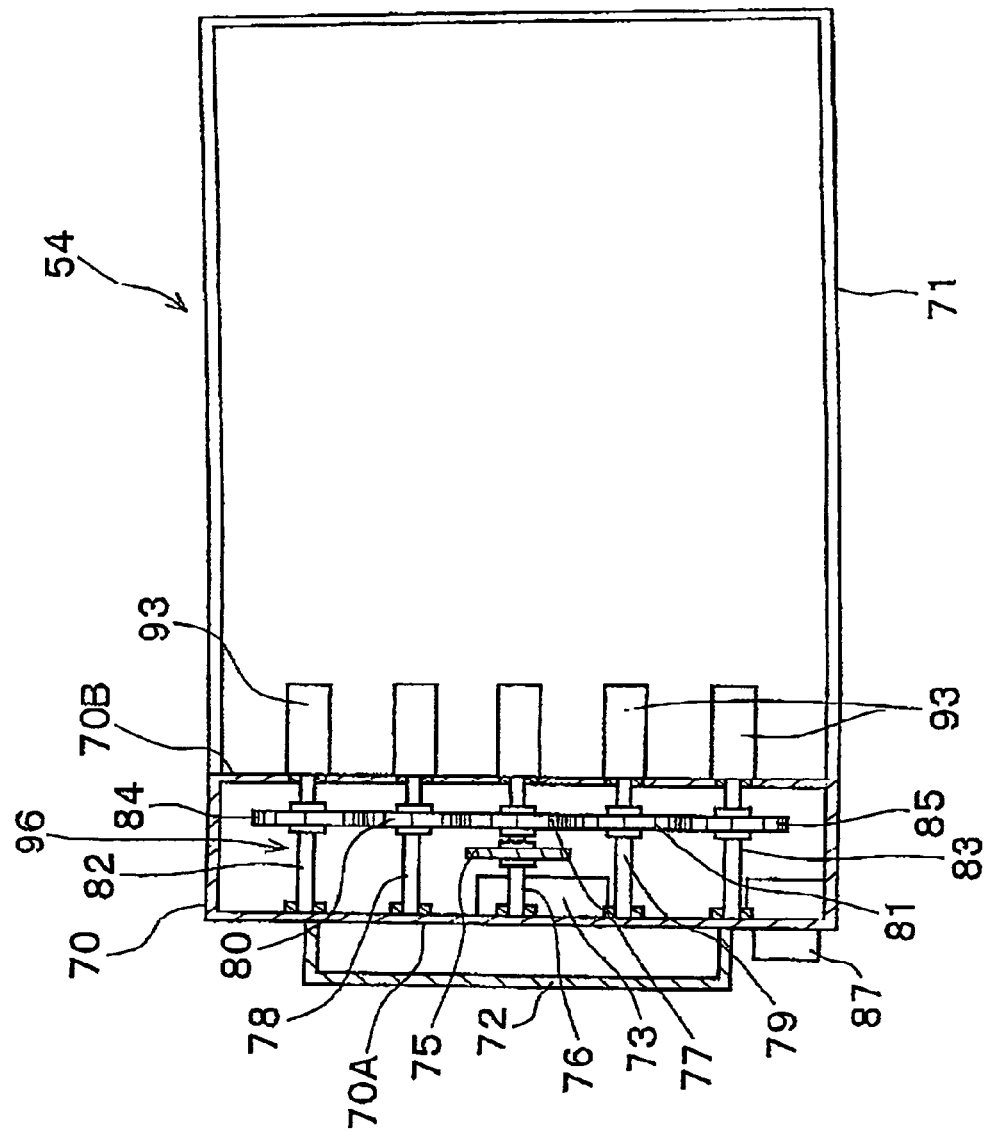
FIG. 15 is a cross-sectional view along line S11—S11 of FIG. 14.

FIG. 14 is a side cross-sectional view of cassette 54. FIG. 15 is a cross-sectional view along line S11—S11 of FIG. 14. The cassettes 54 comprise a box part 70 provided at a front part in the direction of withdrawal from the main apparatus body 52 and a juice receiving member 71 extending rearwards from the lower part of the back surface of the box part 70. A handle 72 is fitted to a front surface 70A of the box part 70, and the cassettes 54 can then be inserted and removed into and out of the main apparatus body 2 by holding the handle 72.

An electric motor 73 constituting a rotational drive source, a worm 74 fixed to a drive shaft of the motor 73, a worm gear 75 meshing with the worm 74 and transmitting with reduced drive force of the motor 73, a transmission gear 77 fitted to a rotating shaft 76 to which the worm gear 75 is fixed, two driven gears 80, 81 fixed to rotating shafts 78 and 79 parallel with the rotating shaft 76 so as to be arranged on the left and right sides of the transmission gear 77 and having the same diameters as the transmission gear 77 and meshing with the transmission gear 77, and driven gears 84 and 85, fixed to rotating shafts 82 and 83 running parallel with rotating shafts 76, 78 and 79 so as to be arranged on the outside to the left and right of the driven gears 80 and 81, having the same diameters as the driven gears 80 and 81, and meshing with the driven gears 80 and 81, are housed within the box part 20.

The rear ends of the rotating shafts 76, 78, 79, 82 and 83 project from the rear surface 20B of the box part 20. Holding members 93 for holding skewers 41 of yakitori 40 are fitted at the rear ends of the rotating shafts. The holding members 93 rotate via rotational means 96 comprising the worm 74, worm gear 75, rotating shafts 76, 78, 79, 82 and 83, the transmission gear 77, and the driven gears 80, 81, 84 and 85 as a result of drive force from the electric motor 73. The configuration of the holding members 93 is the same as for the holding members 33 of the first embodiment.

The juice receiving members 71 are provided positioned to the lower side of the holding members 93 of the cassettes 54. A ceiling member 90 extends from an upper part of the back surface of the box part 70 to the rear. The ceiling member 90 has the same width dimension as the dimension for the width from left to right for the cassettes 54, and is positioned above the juice receiving member 71 so as to sandwich the holding member 93 together with the juice receiving member 71. An electric heater 57 constituting the heating means is provided on the lower surface of the ceiling member 90.

The power unit for control use is configured from a power switch 60 for connecting and disconnecting a supply of electricity from a commercial power supply to the main apparatus body 52, a timer 61, and a lamp 62 that flashes when a time set using the timer 61 has elapsed, incorporated at the lower part of the front surface of the main apparatus body 52.

The power unit for control use may also be provided in a control box separate from the main apparatus body 52, with the control box and the main apparatus body 52 then being connected using an electrical cable.

Electrical connection points are also provided at the cassettes 54 and the guide rails 58 as described previously for the first embodiment.

Cooking temperature regulators 87 for adjusting the heating temperatures of the electric heaters 57 are provided at the respective cassettes 54.

After the yakitori 40 is installed in the holding members 93 and the cassettes 54 are inserted into the openings 53 of the main apparatus body 52 so as to be installed, and when the power switch is turned on, the holding members 93 of the cassettes 54 rotate just for a time set using the timer 61. The food 42 of the yakitori 40 is then cooked by heat from the electric heater 57 which emits heat just for the time set using the timer 61. The heat emitting temperature of the electric heater 57 at this time is a temperature set using a cooking temperature regulator 87.

When the cassettes 54 are inserted into the openings 53, the cooking spaces S become closed or substantially sealed spaces. Heat from the electric heater 57 can therefore be effectively utilized in the cooking of the yakitori 40.

In addition to these results, the same results as for the cooking apparatus of the second embodiment can be obtained.

Next, a description is given based on the drawings of a configuration for cooking apparatus of a fifth embodiment of the present invention.

Figure 16:
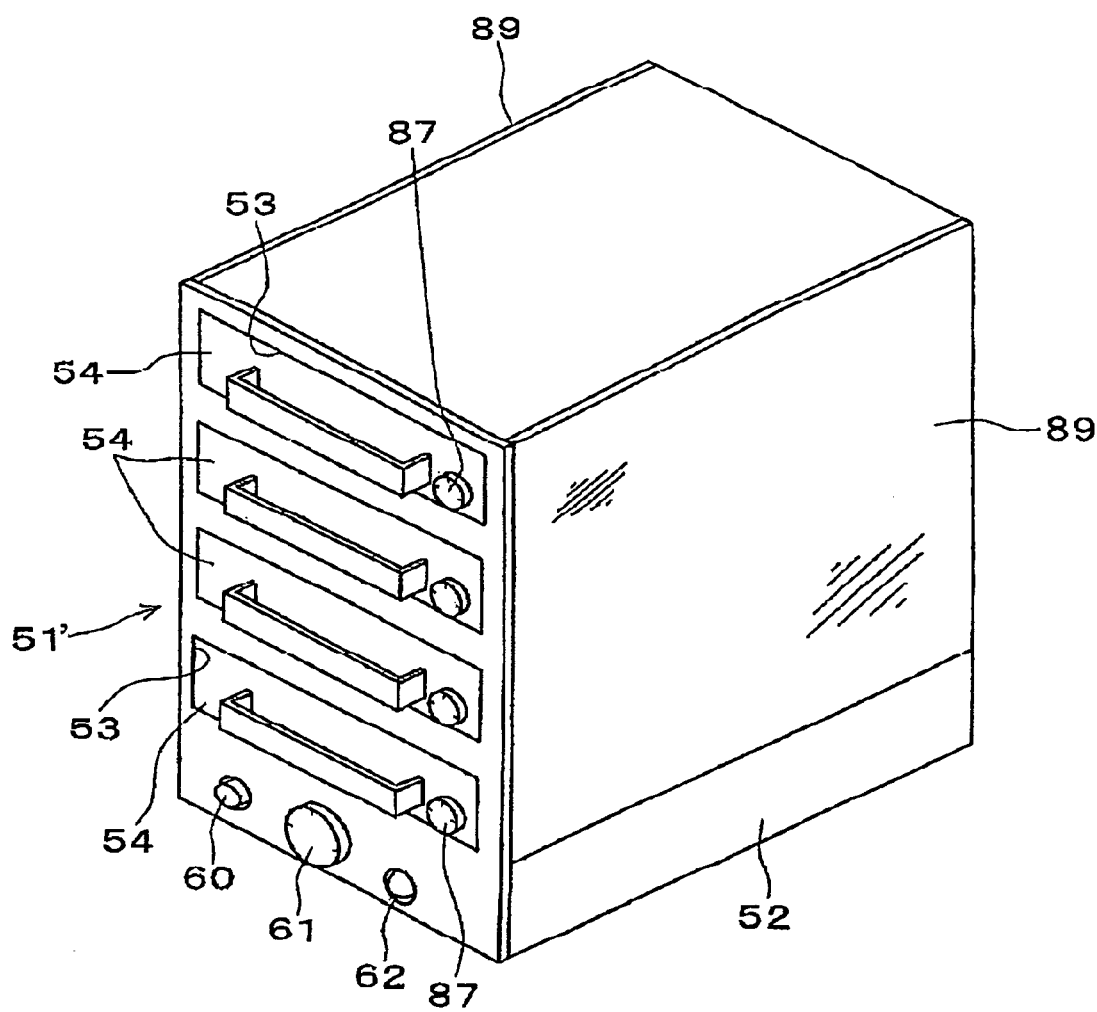
FIG. 16 is an overall perspective view of cooking apparatus of a fifth embodiment of the present invention.

FIG. 16 shows cooking apparatus 51' of a fifth embodiment. With the exception of a part of the left and right side surfaces of a main apparatus body 52 of cooking apparatus 51' being formed of a transparent member 89 consisting of transparent glass or transparent synthetic resin having heat-resistant properties, the configuration of this cooking apparatus 51' is the same.

The transparent member 89 forming a transparent part of the main apparatus body 52 has the same surface area or substantially the same surface area as the entire range over which the cooking spaces S are provided within the main apparatus body 2.

As a result, even if yakitori 40 is cooked within the respective cooking spaces S constituted by sealed spaces or by substantially sealed spaces, it is possible to confirm the cooked state of the yakitori 40 in the cooking spaces S from outside of the main apparatus body 52 by looking through the transparent member 89. It is therefore possible for customers coming to the store to view the cooking state of the yakitori 40 in the cooking spaces S.

The transparent member 89 may also be fitted to the main apparatus body 52 in a detachable manner. Components such as smoke and oil etc. that may hinder the transparency of the transparent member 89 that may become attached as a result of cooking the yakitori 40 can then be cleaned off and removed.

The electric heater may be provided at the upper side guide rail 55 of a pair of upper and lower guide rails 55 provided within the main apparatus body 52 for each opening 53, may be provided at upper side partitioning members 58 of pairs of upper and lower partitioning members 58, and the cooking temperature regulators 87 may be provided at each opening 53 at the front of the main apparatus body 52.

Further, according to the second to fifth embodiments of the present invention, advantages are obtained where heat from the heating means is effectively utilized so as to cook the food.

Figure 17:
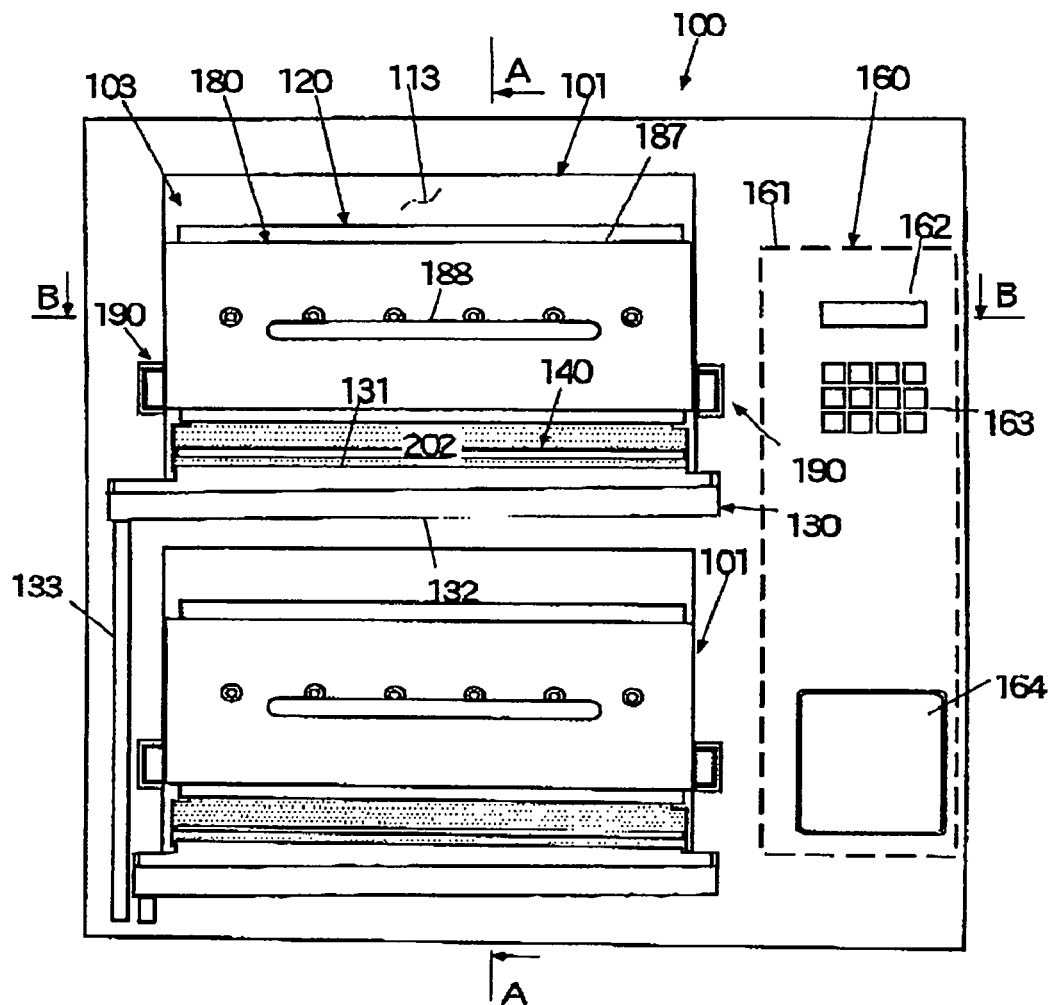
FIG. 17 is a front view of cooking apparatus of a sixth embodiment of the present invention.
Figure 18:
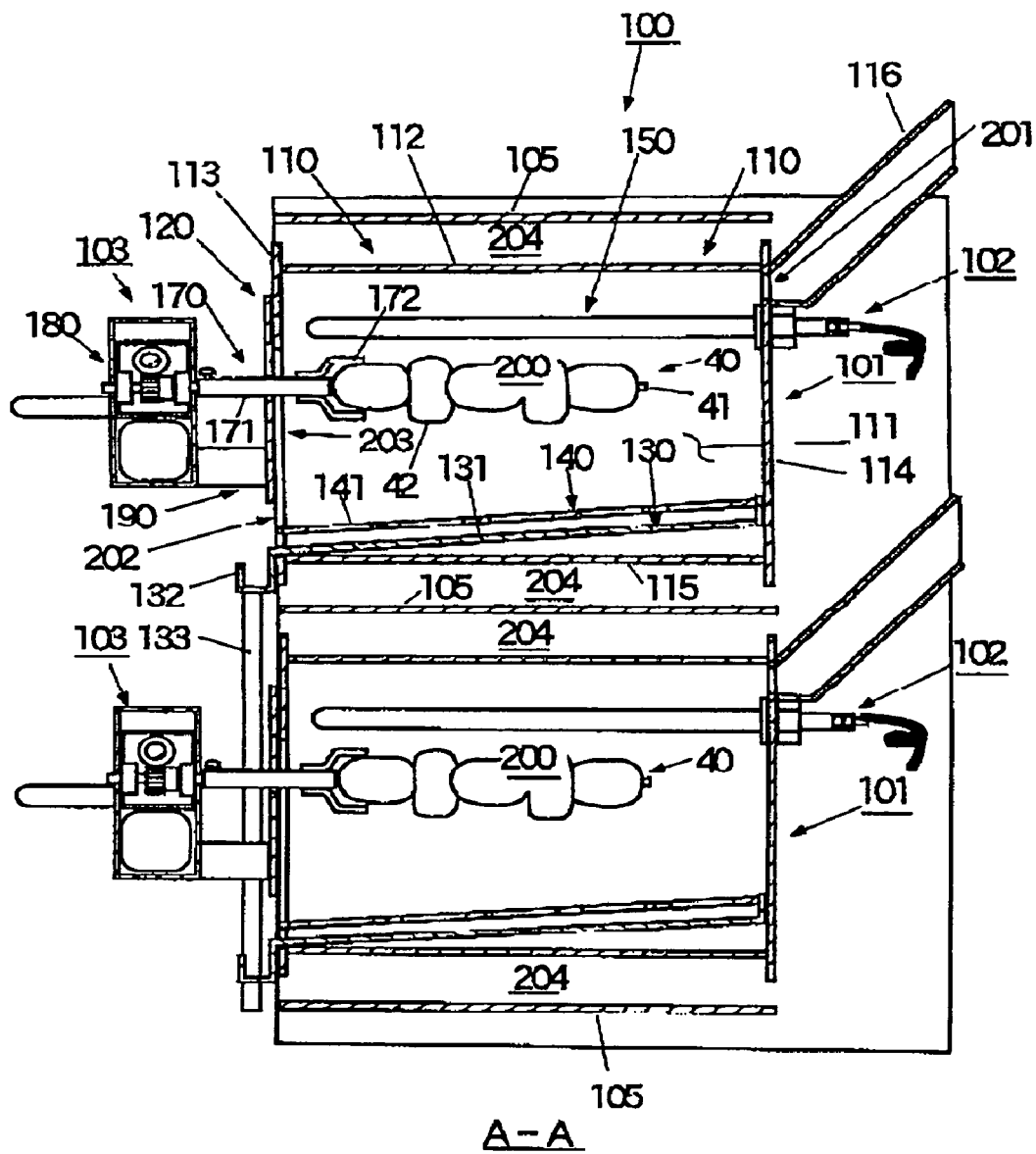
FIG. 18 is a side cross-sectional view of cooking apparatus of the sixth embodiment of the present invention.
Figure 19:
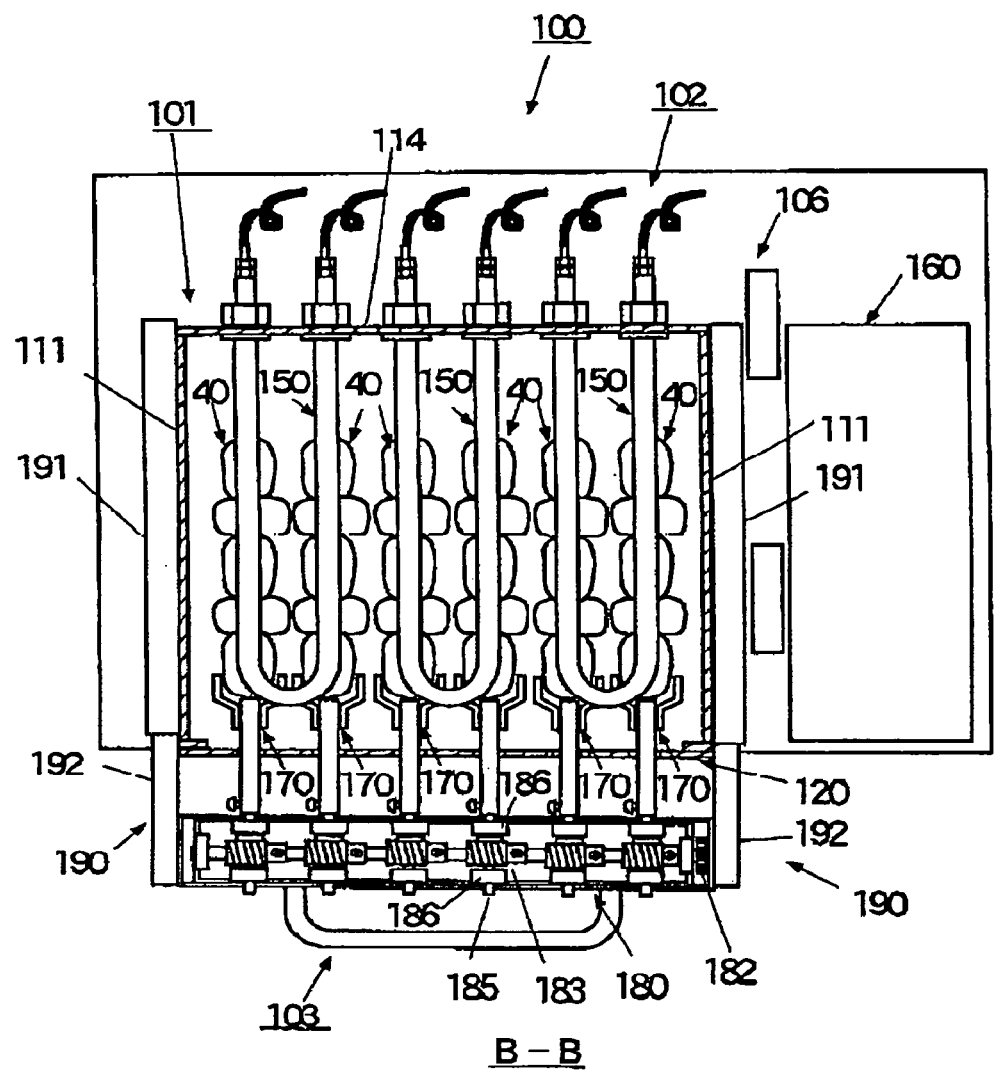
FIG. 19 is a plan view of cooking apparatus of the sixth embodiment of the present invention.
Figure 20:
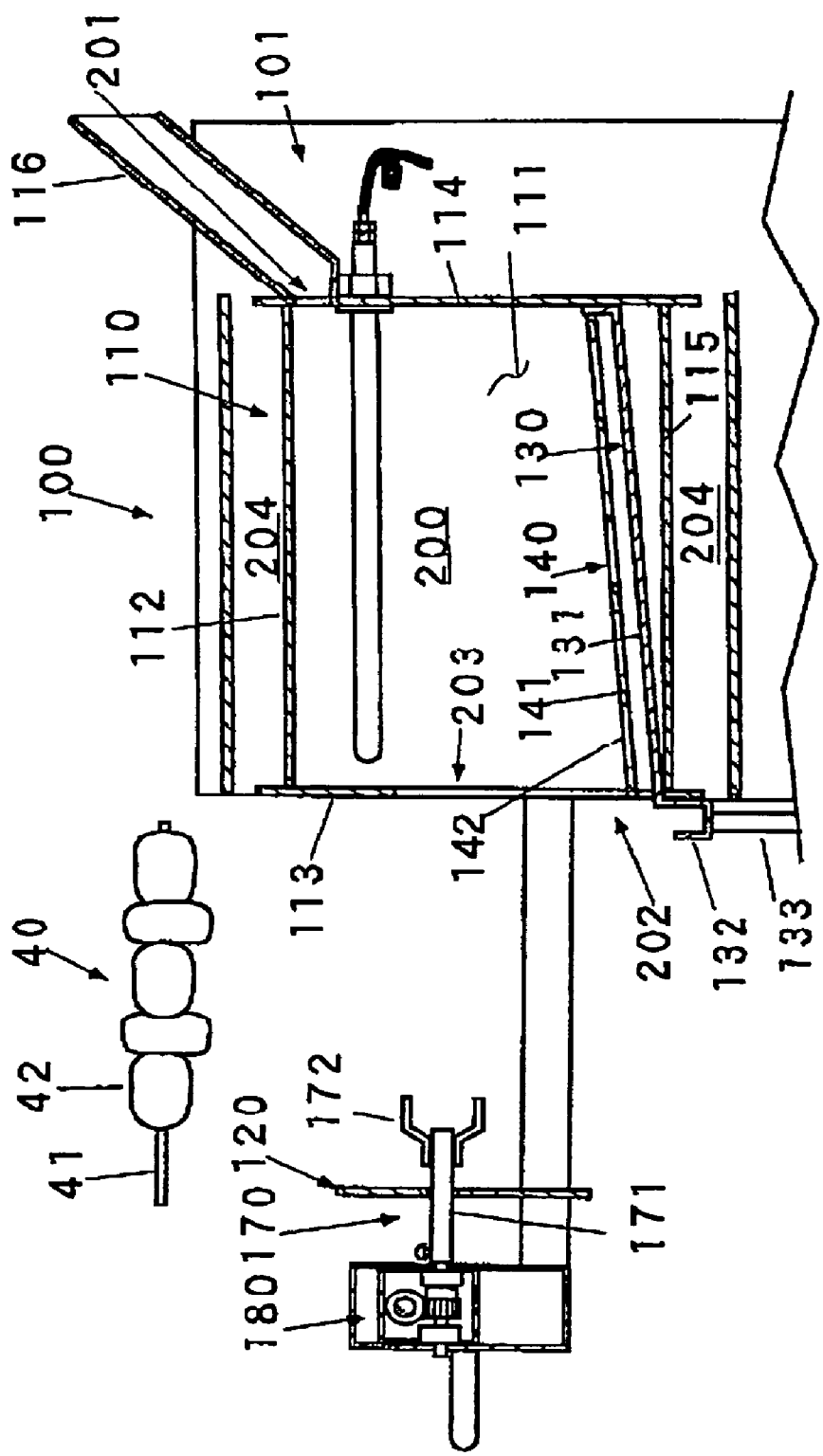
FIG. 20 is a further side cross-sectional view of cooking apparatus of the sixth embodiment of the present invention.
Figure 21:
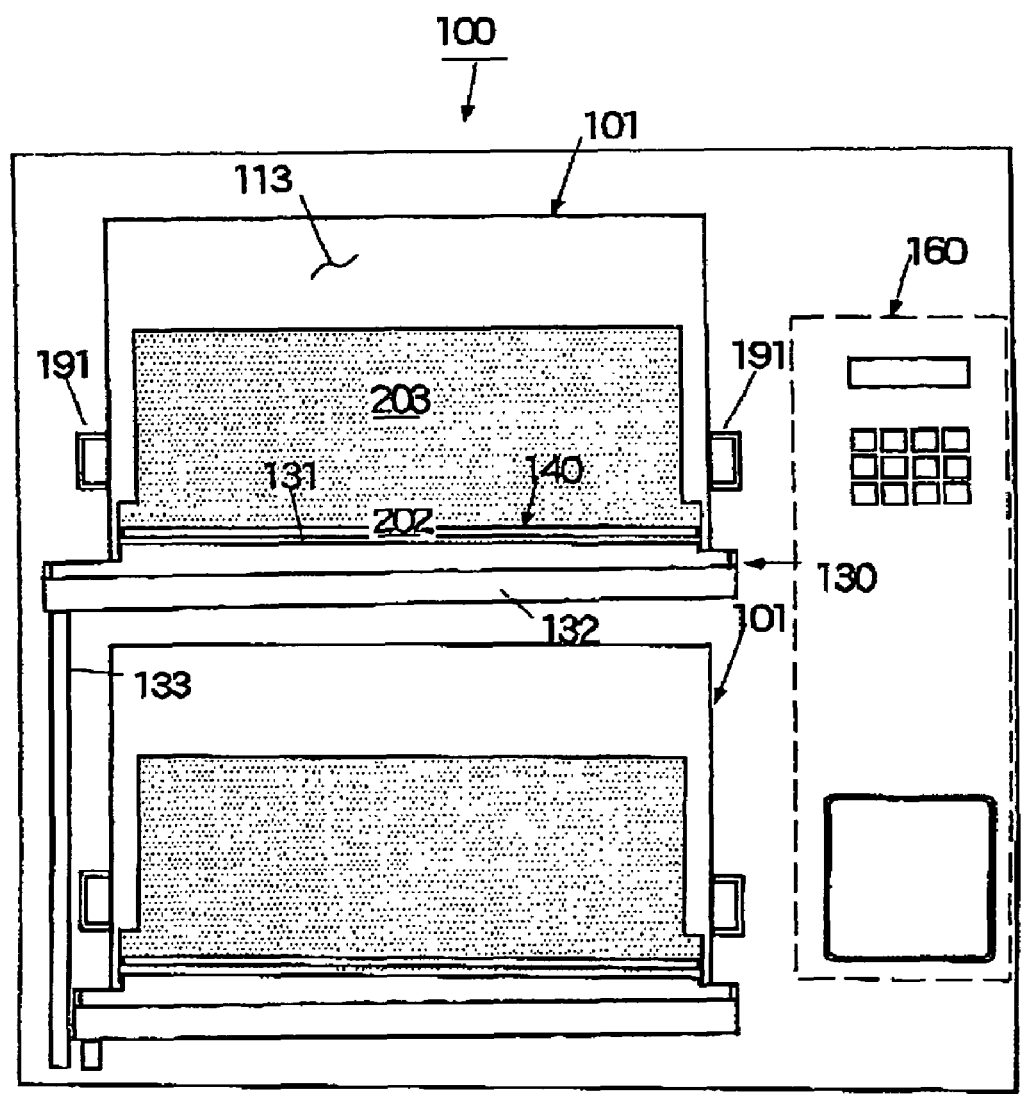
FIG. 21 is a partial front view of cooking apparatus of a sixth embodiment of the present invention.
Figure 22:
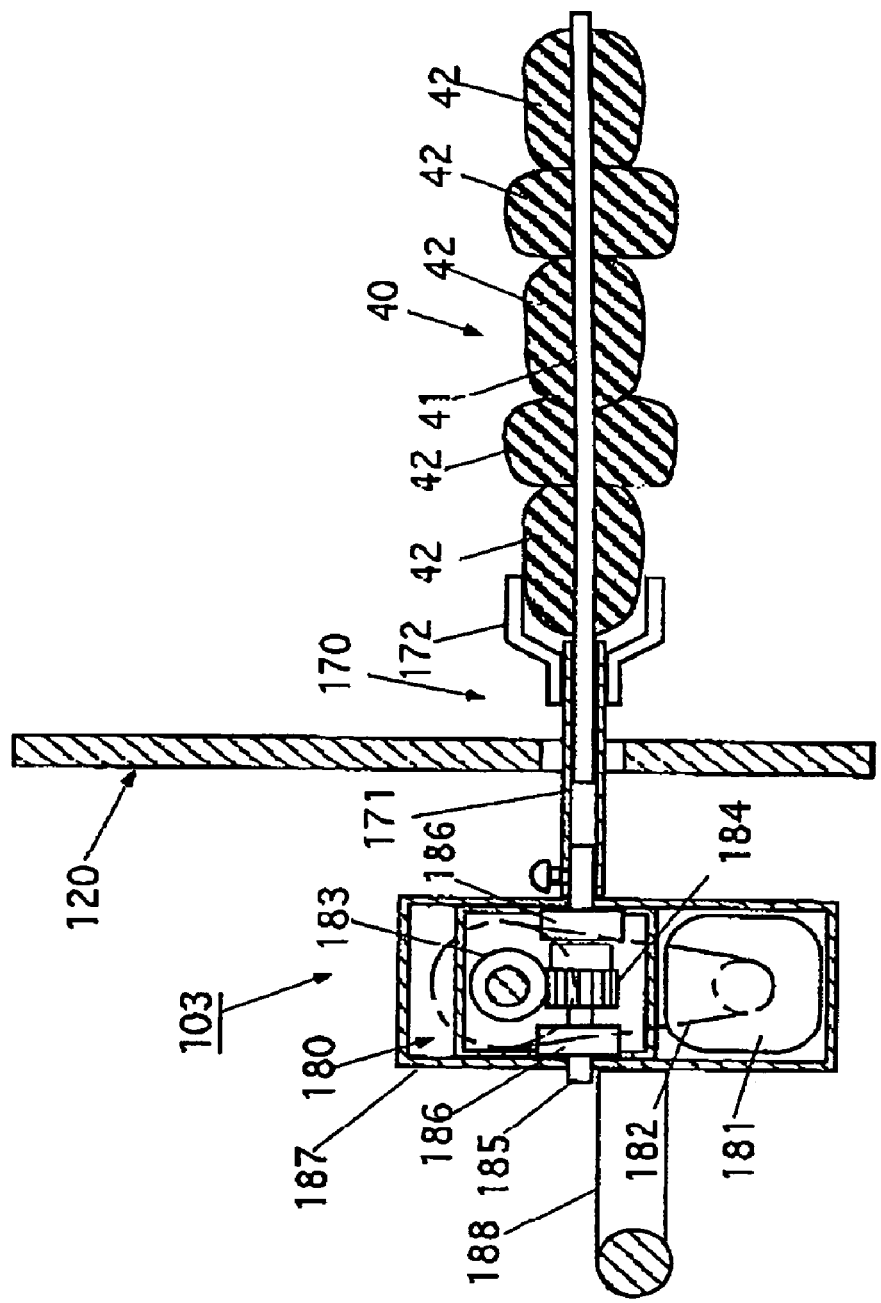
FIG. 22 is a partial view of cooking apparatus of a sixth embodiment of the present invention (one of two).
Figure 23A:
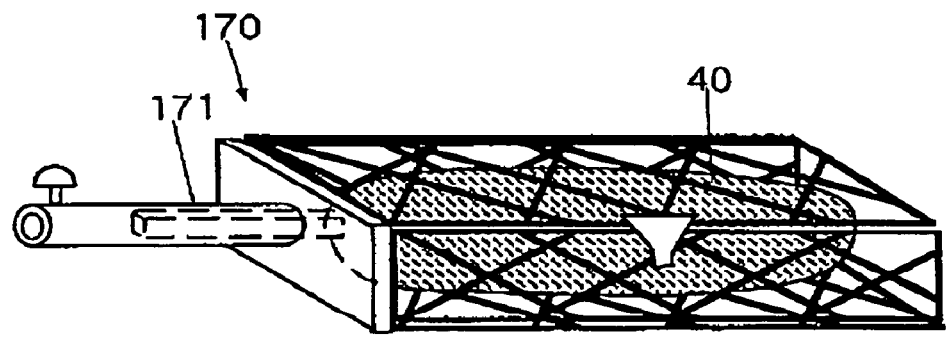
FIG. 23 is a partial view of cooking apparatus of a sixth embodiment of the present invention (two of two).

Next, a description is given of a configuration for cooking apparatus of a sixth embodiment of the present invention. FIG. 17 is a front view of cooking apparatus of a sixth embodiment of the present invention. FIG. 18 is a side cross-sectional view of cooking apparatus of the sixth embodiment of the present invention. FIG. 19 is a plan view of cooking apparatus of the sixth embodiment of the present invention. FIG. 20 is a further side cross-sectional view of cooking apparatus of the sixth embodiment of the present invention. FIG. 21 is a partial front view of cooking apparatus of a sixth embodiment of the present invention. FIG. 22 is a partial view of cooking apparatus of a sixth embodiment of the present invention (one of two). FIGS. 23A and B are partial views of cooking apparatus of a sixth embodiment of the present invention (two of two).

Cooking apparatus 100 is a cooking apparatus for cooking food on skewers, and comprises main apparatus bodies 101, heating apparatus 102, food holding mechanisms 103, and cooling apparatus 104.

FIG. 17 to FIG. 21 show the cooking apparatus 100 equipped with two sets of the main apparatus body 101, heating apparatus 102, and food holding mechanism 103.

The skewered food 14 is food constituted by food 42, and a skewer 41 skewering the food 42. For example, in the case of skewered food of "yakitori" that is one kind of Japanese food, the food may be chicken and vegetables, etc.

The main apparatus body 101 is a main structural component of the cooking apparatus 100 and is comprised of a wall member 110, door member 120, juice receiving member 130, and covering plate 140.

Cooking spaces 200 constituting spaces in which the food is held during cooking are formed in the main apparatus body 101.

The wall members 110 are members forming the cooking spaces 200 and comprise a pair of left and right side surface wall members 111, an upper surface wall member 112, front surface wall member 113, back surface wall member 114, bottom surface wall member 115 and exhaust duct 116.

Openings 203 are provided at the front side wall members 110 of the cooking spaces 200.

Further, the wall members 110 have first ventilation holes 201 communicating with the outside at upper parts of the cooking spaces 200 and second ventilation holes 202 communicating with the outside at lower parts of the cooking spaces 200.

With the exception of the openings 203, first ventilation holes 201 and second ventilation holes 202, the cooking spaces 200 are closed or substantially sealed spaces. In the description of this embodiment, "substantially closed" means "closed with the exception of small holes for piping and wiring, and small holes and gaps required for assembly".

The left and right pairs of side surface wall members 111 form the side surfaces of the cooking spaces 200, and the upper surface wall members 112 form the upper surfaces of the cooking spaces 200. The front surface wall members 113 form a part above the openings 203 of the front surfaces of the cooking spaces 200. The back surface wall members 114 form the back surfaces of the cooking spaces 200 and the bottom surface wall member 115 form the bottom surfaces of the cooking spaces 200. The cooking spaces 200 therefore form substantially six surface spaces.

The exhaust ducts 116 are ducts causing the first ventilation holes 201 to communicate with the outside, and incline upwards from the first ventilation holes 201.

FIG. 18 is a view showing the first ventilation holes 201 provided at the upper parts of the back surface wall members 114 and the second ventilation holes 202 provided at the lower parts of the front surface wall members 113. FIG. 21 is a view showing how the second ventilation holes 202 and the openings 203 connect seamlessly together so as to form a single opening.

When air within the cooking spaces 200 is heated, fresh air enters into the cooking spaces 200 from the second ventilation holes 202, and warm air within the cooking spaces 200 is exhausted to outside using the exhaust ducts 116 via the first ventilation holes 201.

The door members 120 are members capable of covering the openings 203. When the door members 120 are put at the openings 203 provided at the front surface wall members 113 of the main apparatus body 101, the openings 203 are covered over. The second ventilation holes 202 are formed at positions down from the door members 120.

The door members 120 are preferably places made of a material at least the center of which is perfectly transparent such as, for example, a heatproof glass plate. When the door members 120 are transparent, it is possible to watch the food 42 being cooked in the cooking spaces 200.

The juice receiving members 130 are members positioned at the bottom parts of the cooking spaces 200 and are comprised of flat plate sections 131, gutter sections 132, and drainage tube sections 133.

The flat plate sections 131 have flat parts positioned above the upper surface of the bottom surface wall members 115 and are capable of receiving liquid dripping from above. The flat plate sections 131 are preferably inclined downwards in a direction from the back surfaces of the cooking spaces 200 towards the front surfaces.

The gutter sections 132 are gutter-shaped portions provided at an end of the front side surfaces of the flat plate sections 131. The gutter sections 132 are seen to incline to the left or right when viewed from the front.

The drainage tube sections 133 are tubular portions provided at lower ends of the inclined gutter sections 132.

The covering plates 140 are plates having a plurality of holes for covering the upper surfaces of the flat plate sections 131 and comprise a covering plate body 141 and a plurality of holes 142.

When gravy etc. falls from food placed in a cooking space 200, the gravy contacts the covering plate body 141 of the covering plate 140, passes through the plurality of holes 142, and falls onto the flat plate section 131 of the juice receiving member 130. Gravy is then collected at the gutter section 132 and discharged from the drainage tube section 133.

Radiant heat emitted from a heater 150 then contacts the covering plate 140 so as to be blocked. The radiant heat therefore does not make direct contact with gravy collected in the juice receiving member 130.

It is preferable for the juice receiving member 130 and the covering plate 140 to be detachable from the wall member 110. When the juice receiving member 130 and the covering plate 140 are removed, cleaning of the juice receiving member 130 and the covering plate 140 is easy.

The heating apparatus 102 is apparatus for heating the skewered food 40 supported in the cooking space 200, and comprises the heater 150 and a power supply control device 160.

The heater 150 is provided in such a manner that heat-emitting sections are positioned at upper parts of the cooking spaces 200. For example, the heater 150 is a sheath heater made in the shape of a straight line, a U-shape, or a W-shape, etc. When the heater 150 is a sheath heater, the heat-emitting section may be a region excluding the side of a terminal. When the sheath heater is excited, the heat-emitting section emits heat, air within the cooking spaces 200 is heated, and heat is radiated directly onto the food 42 of the skewered food 40 positioned below.

FIG. 18 is a view showing three sets of heaters 150 fixed by screws to the back surface wall member 114, and shows heat-emitting sections arranged horizontally at the upper part of the cooking spaces 200.

The power supply control apparatus 160 is apparatus for controlling heat emitted by the heaters 150 and for supplying electrical power to a rotating mechanism 180 (described later), and comprises a control apparatus main body 161, display unit 162, operation unit 163, and power supply unit 164. The control apparatus main body 161 is apparatus for bringing about microcomputer control. The display unit 162 is a portion for providing control information to an operator. The operation unit 163 is a portion for receiving control instructions from an operator. The power supply unit 164 is a portion for supplying electricity to the heater 150 and the rotating mechanism 180.

The food holding mechanisms 103 are mechanisms capable of supporting skewers positioning food horizontally below heat-emitting sections in the cooking spaces 200 in a manner freely rotatable about the central axes of rotation of the skewers, and each comprises a holding member 170, rotating mechanism 180, and guide mechanism 190.

The food holding mechanism 103 is preferably capable of supporting substantially horizontal skewers in a manner freely rotatable about their central axis of rotation.

The holding member 170 is a member for holding one end of a skewer, and come, for example, in two forms.

It is preferable for the holding member 170 to hold the skewered food in such a manner that skewers 41 of the skewered food 40 are parallel with the heat-emitting sections of the heaters 150 in the cooking spaces 200.

A first form of holding member is comprised of a rod member 171 and a pair of branching members 172. The rod member 171 is a member formed in the shape of a rod provided with a hole into which one end of a skewer is inserted. The branching members 172 are supported at one end of the rod member 171 and are erected so as to extend along the sides of food 42 along the skewer.

The rod member 171 passes through the door member 120.

FIG. 22 shows the first form for a holding member 170.

Typically, when the food 42 is heated, the food softens and becomes easier to rotate using rotation of the skewer 41. When a holding member 170 of the first form holds skewered food 40, the branching members 172 are pushed towards the outside of the food. The skewer 41 and the food 42 can then be rotated in an integral manner.

A second form of holding member 170 comprises a rod member 171, a pair of mesh members 173 and 174, a pair of mesh members 175 and 176, hinges 177, a clasp 178, and a base 179.

The rod member 171 is a member formed in the shape of a rod provided with a hole into which one end of a skewer is inserted. The mesh members 173 and 174 are mesh members with stitch holes supported by the rod member 171 and extending along the skewers so as to sandwich the food 42 from both sides. The mesh members 175 and 176 are also mesh members with stitch holes supported by the rod member 171 and extending along the skewers so as to sandwich the food 42 from both sides.

The mesh members 173, 174, 175 and 176 have a form where, for example, mesh is hung on a rectangular frame formed from a long side and a short side. The base 179 is fixed to the rod member 171, and is a member for fixing one end of the mesh members 174, 175 and 176 and has, for example, a quadrangle plate structure. Short sides of the mesh members 174, 175 and 176 are fixed to the base 179. The mesh members 173, 174, 175 and 176 are arranged with their long sides touching in such a manner as to encompass the skewered food held at the rod member 171. One long side of the mesh member 174 is connected to a long side of the mesh member 175 by the hinges 177. The other long side of the mesh member 174 is capable of being locked and unlocked to a long side of the mesh member 176 using the clasp 178.

When the clasp 178 is unlocked, the mesh member 176 can swing about the hinges 177, so that skewered food can be easily fitted to and extracted from the holding member 170.

The rod member 171 passes through the door member 120.

Figure 23B:
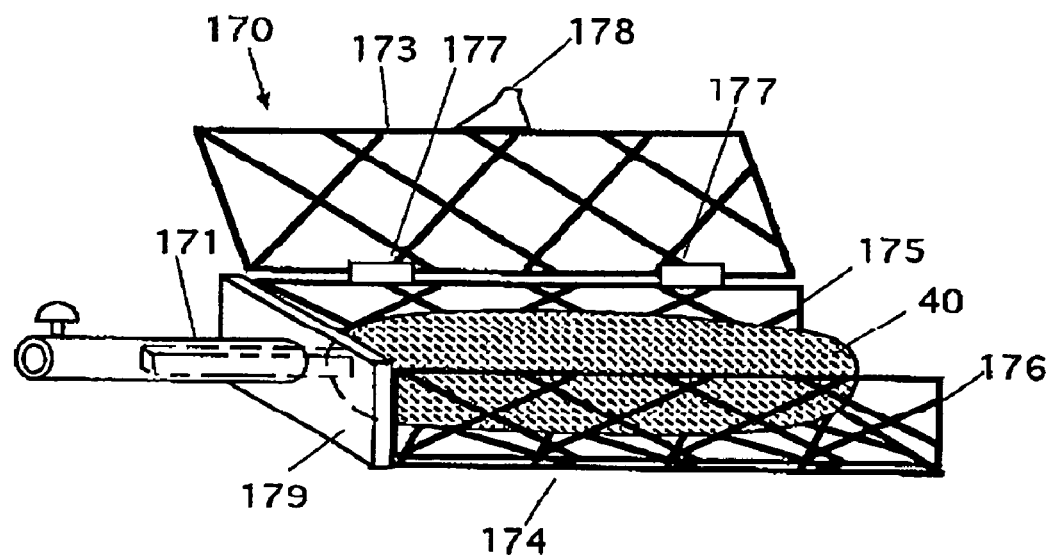

FIG. 23 shows the second form for a holding member 170. The second form for the holding member 170 is appropriate for holding skewered food 40 where the food 42 is constituted by minced chicken formed into an elongated shape.

Typically, when the food 42 is minced chicken, the food 42 becomes soft when heated, and it is easy for the food 42 to come away from the skewer 41. When a holding member 170 of the second form holds skewered food 40, the pair of mesh members 173 sandwich the food from the outside. The skewer 41 and the food 42 can then be rotated in an integral manner, and the food 42 can be prevented from coming away from the skewer 41.

The number of holding members 170 is the same as the number of sticks of skewered food arranged in a cooking space 200.

The rotating mechanism 180 is a mechanism for rotating a holding member 170 about the central axis of rotation of a skewer 41 and comprises a motor 181, drive chain 182, worm wheel 183, worm gear 184, rotating shaft 185, bearing 186, rotating mechanism frame 187, and handle 188.

The number of combinations of the worm wheel 183, worm gear 184, rotating shaft 185, bearing 186, and rotating mechanism frame 187 is the same as the number of holding members 170.

The motor 181 is a power source for the rotating mechanism 180 and is, for example, an induction motor with reduction gears.

The drive chain 182 is a mechanical element for transmitting rotational force of the motor 181 to the worm wheel 183.

The worm wheel 183 rotates and transmits rotation to the worm gear 184.

The worm gear 184 causes the rotating shaft 185 to rotate.

The rotating shaft 185 is supported by the bearing 186 at two points. One end of the rotating shaft 185 is coupled to the rod member 171 of the holding member 170.

The rotating mechanism frame 187 is a box made of plates, and has the motor 181, drive chain 182, worm wheel 183, worm gear 184, rotating shaft 185 and bearing 186 built-in. The handle 188 is fixed to the front surface of the rotating mechanism frame 187.

FIG. 19 is a view showing the rotating mechanism 180 holding and rotating six holding members 170 lined up horizontally.

FIG. 22 shows when an end of the rotating shaft 185 is inserted into a hole of the rod member 171 and is fixed using a locking screws.

The guide mechanism 190 is a mechanism for guiding in such a manner as to enable food 40 held by the food holding mechanism 103 to pass through the opening 203 and enable free movement between the inside and outside of the cooking space 200, and comprises two guide rails 191 and guide bars 192.

The guide rails 191 are rails for providing support to freely move the guide bars 192 in a lengthwise direction, and are, for example, rod members with a rectangular cross-section that are hollow in the middle. The guide rails 191 are fixed to the outside surface of the main apparatus body 101.

The guide bars 192 are lengthwise members supporting the guide rails 191, and are, for example, rod members having an outer shape engaging with the rectangular cross-section of the spaces. The guide bars 192 are fixed to the side surface of the rotating mechanism frame 187 and the side surface of the door member 120.

When the handle 188 is pulled, the rotating mechanism 180 and the door member 120 are guided by the guide mechanism 190 so as to move horizontally.

The cooling apparatus 104 is an apparatus for cooling the outer side of the main apparatus body 101 and is comprised of partition plates 105 and fans 106.

The partition plates 105 are plates for partitioning spaces between the main apparatus body 101 stacked up with multiple stages and spaces between the main apparatus body 101 and the outer skin of the cooking apparatus 100. An air cooling path 204 is formed between the partition plates 105 and the main apparatus body 101.

The fans 106 are equipment for forcing cooling air to pass at the air cooling path 204. The fans 106 cause cooling air to flow from a side of the power supply control apparatus 160 to the opposite side, and maintain the temperature of the surface of the cooking apparatus 100 at an appropriate value.

Next, a description is given of a procedure for an operator to cook skewered food using the cooking apparatus 100 of the sixth embodiment.

First, the operator prepares the skewered food.

Next, the operator takes hold of the handle and pulls the rotating mechanism frame 187 forwards.

FIG. 20 shows the situation when the rotating mechanism frame 187 is pulled forward.

The holding mechanism 170, rotating mechanism 180, and door member 120 are guided by the guide mechanism 190 so as to be pulled out to the front.

The user then fits the skewered food 40 to the holding member 170. One end of a skewer is then inserted into the hole of the rod member 171. The rod member 171 and the mesh member 173 then prevent the food 42 from rotating.

The operator then takes hold of the handle, pushes the rotating mechanism frame 187, and the food 42 for the skewered food 40 is put into the cooking spaces 200. The door member then closes over the opening 203. The second ventilation holes 202 are formed down from the door members 120.

The operator then operates the operation unit 163, and sets the excitation time of the heater 150, rotation time of the holding member 170, and a rotation mode. The rotation mode may be, for example, a continuous rotation mode where rotation takes place using a continuously fixed rotation, or may be an intermittent rotation mode of repeating a sequence where rotation takes place through 180 degrees and is then paused, etc.

The operator selects continuous rotation mode or intermittent rotation mode in line with the characteristics of the skewered food.

The operator then presses the start button and cooking starts.

The cooking apparatus 100 the cooks skewered food 40 as instructed.

Hot gas within the wall member 110 then heats the food within the cooking spaces 200. Radiant heat direct from the heater then moderately scorches the surface of the food. Because the insides of the cooking spaces 200 are heated up, air enters from the second ventilation holes 202, and exits to the outside from the first ventilation holes 201 via the cooking spaces 200. Steam coming out from the food 42 is exhausted to the outside from the first ventilation holes 201 via the cooking spaces 200. The steam therefore does not collect in the cooking spaces 200 and the food 42 can therefore be cooked in a moderately dry and tasty manner.

Gravy also comes from the food 42. The gravy drips down, and falls onto the covering plate 140. The gravy then passes through the holes 142 of the covering plate 140 and falls onto the juice receiving member 130. The gravy flows along the flat plate section 131, is collected at the gutter section 132, and is discharged to outside from the drainage tube section 133. The gravy then exits promptly from the cooking space 200, and the exiting of grease and fumes is suppressed.

When the cooking that is set is complete, the power supply control apparatus 160 notifies the operator using a buzzer, etc.

The operator then pulls the rotating mechanism frame 187 out to the front, and the skewered food 40 is taken out from the holding member 170.

When the cooking time, rotation time, and rotation mode are appropriately set, fragrant skewered food can easily be cooked without being burnt.

Figure 24:
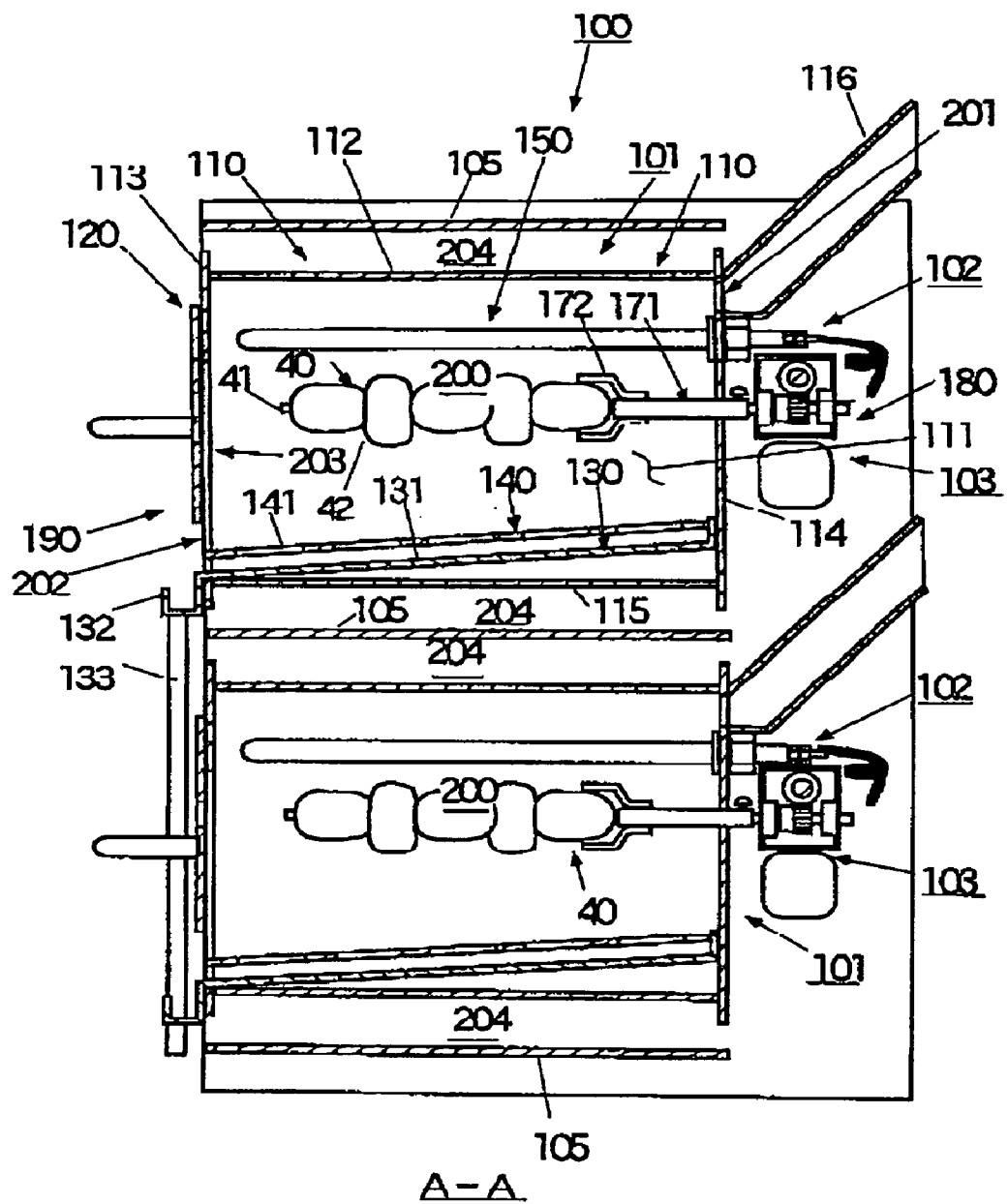
FIG. 24 is a further side cross-sectional view of cooking apparatus of a seventh embodiment of the present invention.

The following is a description based on the drawings of cooking apparatus 100 of a seventh embodiment. FIG. 24 is a further side cross-sectional view of cooking apparatus of a seventh embodiment of the present invention.

Cooking apparatus 100 is an apparatus for cooking food on skewers, and comprises main apparatus bodies 101, heating apparatus 102, food holding mechanisms 103, and cooling apparatus 104.

The structure of the main apparatus body 101, heating apparatus 102, food holding mechanism 103, and cooling apparatus 104 is the same as the structure for the cooking apparatus of the sixth embodiment, and description thereof will therefore be omitted.

The food holding mechanisms 103 are mechanisms capable of supporting skewers positioning food horizontally below heat-emitting sections in the cooking spaces 200 in a manner freely rotatable about the central axes of rotation of the skewers, and each comprises a holding member 170, rotating mechanism 180, and guide mechanism 190.

The internal configuration of the food holding mechanism 103 is the same as the configuration for the food holding mechanism 103 of the cooking apparatus of the sixth embodiment, and description thereof is omitted, with only points of difference being described.

The rotating mechanism 180 is provided on the outer side of the back surface wall member 114 of the wall member 110. The rod member 171 of the holding member 170 passes through the back surface wall member 114.

The guide mechanism 190 only guides the door member 120.

The door member 120 is comprised of a door member body 121 and a handle 122.

The door member body 121 is preferably made of a transparent material (for example, a heat-resistant glass plate, etc.).

The opening 203 is opened when the door member 120 is pulled out to the front.

The operator can then put skewered food inside the cooking spaces 200.

Next, a description is given or a procedure for cooking skewered food using the cooking apparatus 100 of the seventh embodiment.

First, the operator prepares the skewered food.

Next, the door member 120 is pulled out to the front.

The door member 120 is guided by the guide mechanism 190 so as to be pulled out to the front so that the opening 203 opens.

The operator then puts the skewered food 40 into the cooking spaces 200 via the openings 203, and fits the skewer into the holding members 170. The operator then inserts ends of the skewers into the holes of the rod members 171. The rod members 171 or the mesh members 173 then prevent the food 42 from rotating.

The operator then pushes the door member 120 and the openings 203 are closed.

The second ventilation holes 202 are formed down from the door members 120.

The operator then operates the operation unit 163, and sets the excitation time of the heater 150, rotation time of the holding member 170, and a rotation mode. The rotation mode may be, for example, a continuous rotation mode where rotation takes place using a continuously fixed rotation, or may be an intermittent rotation mode where rotation takes place through 180 degrees and is then paused, etc.

The operator then presses the start button and cooking starts.

The cooking apparatus 100 the cooks skewered food 40 as instructed.

Hot gas within the wall member 110 then heats the food within the cooking spaces 200. Radiant heat direct from the heater then moderately scorches the surface of the food. Because the insides of the cooking spaces 200 are heated up, air enters from the second ventilation holes 202, and exits to outside from the first ventilation holes 201 via the cooking spaces 200. Steam coming out from the food 42 is exhausted to the outside from the first ventilation holes 201 via the cooking spaces 200. The steam therefore does not collect in the cooking spaces 200 and the food 42 can therefore be cooked in a moderately dry and tasty manner.

Gravy also comes from the food 42. The gravy drips down, and falls onto the covering plate 140. The gravy then passes through the holes 142 of the covering plate 140 and falls onto the juice receiving member 130. The gravy flows along the flat plate section 131, is collected at the gutter section 132, and is discharged to outside from the drainage tube section 133. The gravy then exits promptly from the cooking space 200, and the exiting of grease and fumes is suppressed.

When the cooking that is set is complete, the power supply control apparatus 160 notifies the operator using a buzzer, etc.

The operator then pulls the door member 120 out to the front, and the skewered food 40 is taken out from the holding member 170.

When the cooking time, rotation time, and rotation mode are appropriately set, fragrant skewered food can easily be cooked without being burnt.

Figure 25:
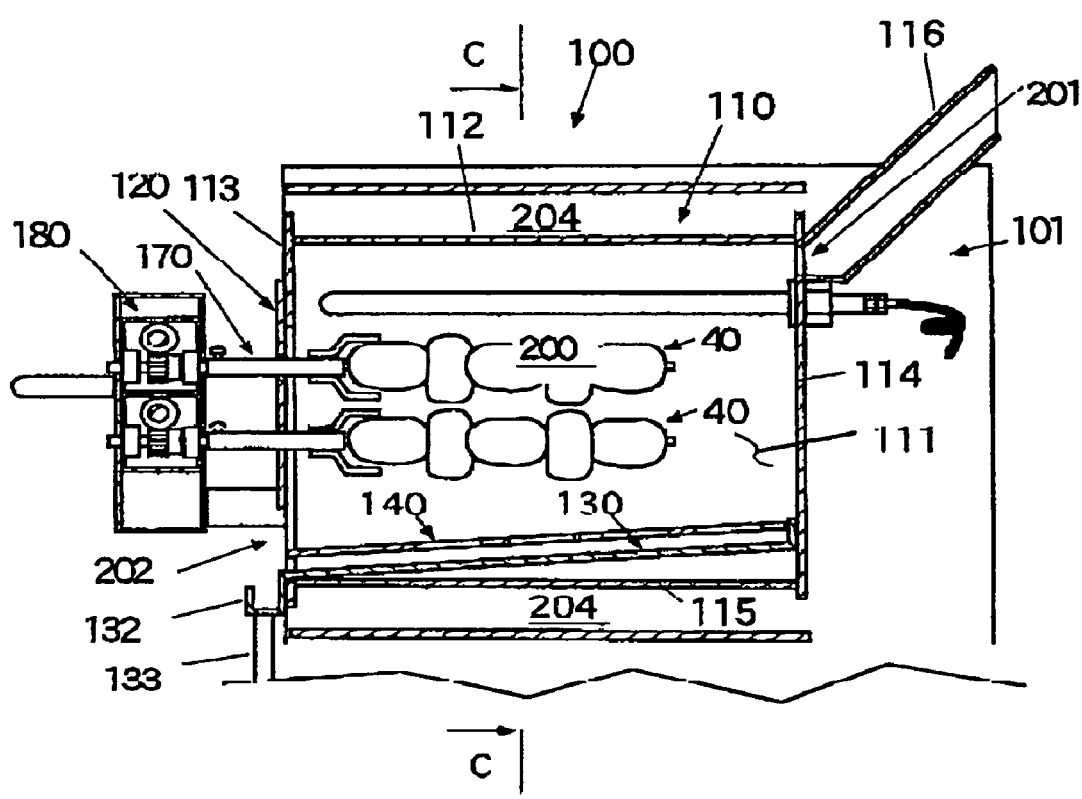
FIG. 25 is a further side cross-sectional view of cooking apparatus of an eighth embodiment of the present invention.
Figure 26:
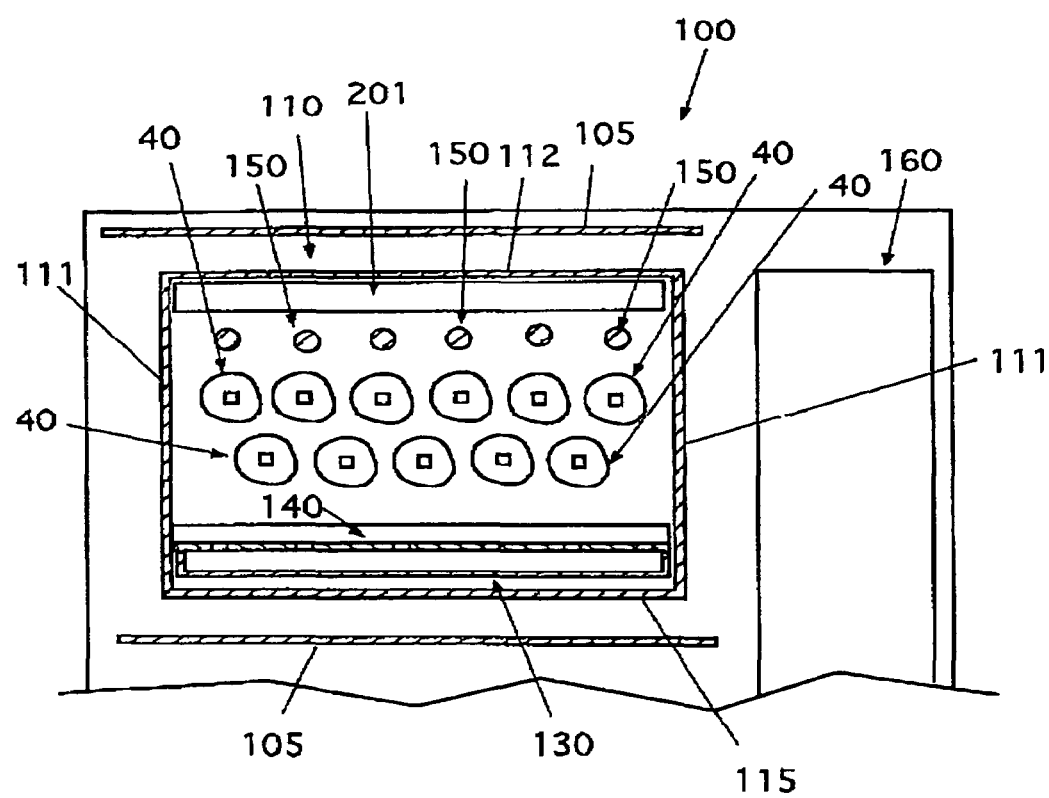
FIG. 26 is a front cross-sectional view of cooking apparatus of the eighth embodiment of the present invention.

The following is a description based on the drawings of cooking apparatus 100 of an eighth embodiment. FIG. 25 is a further side cross-sectional view of cooking apparatus of an eighth embodiment of the present invention. FIG. 26 is a front cross-sectional view of cooking apparatus of the eighth embodiment of the present invention.

Cooking apparatus 100 is an apparatus for cooking food on skewers, and comprises main apparatus bodies 101, heating apparatus 102, food holding mechanisms 103, and cooling apparatus 104.

The structure of the main apparatus body 101, heating apparatus 102, food holding mechanism 103, and cooling apparatus 104 is the same as the structure for the cooking apparatus of the sixth embodiment, and description thereof will therefore be omitted.

The food holding mechanisms 103 are mechanisms capable of supporting skewers positioning food horizontally below heat-emitting sections in the cooking spaces 200 in a manner freely rotatable about the central axes of rotation of the skewers, and each comprises a holding member 170, rotating mechanism 180, and guide mechanism 190.

The internal configuration of the food holding mechanism 103 is the same as the configuration for the food holding mechanism 103 of the cooking apparatus of the sixth embodiment, and description thereof is omitted, with only points of difference being described.

The food holding mechanisms 103 arrange the plurality of holding members 170 in a number of stages. It is also preferable for holding members arranged at different stages to be offset in a line.

FIG. 26 shows the holding members 170 arranged in two stages, with six holding members 170 being arranged at an upper stage, and five holding members 170 being arranged at a lower stage, with the arrangement position of the upper stage holding members 170 and the arrangement position of the lower stage holding members 170 being offset by a half-pitch.

As a result of doing this, for example, skewered food that allows heat to pass easily (for example, vegetables) is supported by the holding members of the lower stage. This means that the cooking time for skewered food held at the holding members of the upper stage and the cooking time of skewered food supported by the holding members of the lower stage is substantially the same.

The opening 203 is opened when the door member 120 is pulled out to the front. The operator can then put skewered food inside the cooking spaces 200.

A procedure for cooking skewered food using the cooking apparatus 100 of the eighth embodiment is the same as the procedure for cooking skewered food using the cooking apparatus 100 of the sixth embodiment, and a description thereof is therefore omitted.

Through experimentation carried out by the inventor with the cooking apparatus of the sixth embodiment, regarding the fact that it is usual for the cooking times for different types of meat to be different when cooking spit-roasted food using traditional methods, it was found that it is possible, when cooking different types of food such as tongue, liver, skin, or meat etc., for all of these foodstuffs to be cooked at substantially the same time.

Further, heating was sufficient to the center of the food even when cooking frozen skewered food, and the food quality of such frozen food was improved.

Moreover, the surface of the cooked food was of a firmness that is pleasant to bite. This can be considered to be because there was only a small amount of moisture in the cooking spaces due to the atmosphere of the cooking spaces being discharged from the ventilation holes.

Further, very little smoke was generated compared to conventional cooking methods where a great deal of smoke is generated. This can be considered to be because the juice dripping from the food did not make direct contact with the heater.

If skewered food is cooked using the cooking apparatus of the sixth to the eighth embodiments, the following effects are achieved.

The heater is such that heat-emitting sections are provided positioned at the upper parts of the heating spaces formed by the six surfaces of the wall members and the skewered food is rotated horizontally below the heater. The cooking space is therefore heated by heat collected at the wall members and the skewered food is heated up.

Further, the food holding mechanisms hold skewered food below the heat-emitting sections. The surface of the food can therefore be moderately cooked using radiant heat from the heat-emitting sections of the heater.

Moreover, juice dripping from the heated food does not contact the heat-emitting sections and there is therefore little generation of smoke resulting from juice being heated up.

The rotating mechanism rotates the skewered food, meaning that the operator is not always required to be at the cooking apparatus.

Further, juice falling from the food is collected at the juice receiving member and discharged to the outside. Getting rid of the juice is straightforward.

Further, openings are formed at the front surfaces of the wall members, so that placing of skewered food in the cooking spaces is easy.

The openings can be covered over using the door members, so that it is difficult for heat within the cooking spaces to escape during cooking.

Moreover, first ventilation holes communicating with the outside are provided at the upper part of the cooking space. Air in the cooking space can therefore be exhausted to the outside, and steam coming out from the food can be discharged quickly. The cooking spaces are therefore moderately dry, and the taste of the cooked food is improved.

Second ventilation holes communicating with the outside are also provided at the bottom parts of the cooking spaces. Fresh air therefore naturally enters into the cooking spaces from the second ventilation holes when heated air in the cooking spaces is exhausted from the first ventilation holes.

Further, the holding members are comprised of rod members and branching members. The skewered food can therefore easily be held and can be removed in a straightforward manner.

Moreover, the holding members may also be comprised of a rod member and a mesh member. The food is therefore easily held even when food becomes soft when cooked.

When the door member is made of transparent material, the condition of the food being cooked can be confirmed through observation.

The present invention therefore provides a skewered food cooking apparatus and food supporting member for skewered food that is capable of cooking the food while effectively utilizing heat from a heating means.

The present invention is by no means limited to the above embodiments and various modifications are possible without deviating from the spirit of this invention.

For example, a description is given of an example of a configuration where the cooking spaces are made up of wall members, with the wall members consisting of a pair of side surface wall members, an upper surface wall member, a front surface wall member, a back surface wall member, and a bottom surface wall member. However, this is by no means limiting, and, for example, the bottom wall surface member may be omitted.

Further, a description is given of an example of a substantially six-sided cooking space, but this is by no means limiting.

Moreover, a description is given where the openings and the second ventilation openings form a seamless opening, but the present invention is by no means limited in this respect, and the second ventilation holes may also be provided in the side wall members or at lower parts of the back wall member.

Still further, a covering plate is provided on the juice receiving member but the present invention is by no means limited in this respect, and, for example, the covering plate may be omitted.

Moreover, the juice receiving members are provided on the bottom wall member but the present invention is not limited in this respect, and, for example, the bottom wall member may simply double as a juice-receiving member.

Further, a phenomena of natural flow is utilized to exhaust the atmospheres of the cooking spaces to the outside but the present invention is by no means limited in this respect, and, for example, an exhaust fan may also be provided at an exhaust duct.

The present invention therefore provides a skewered food cooking apparatus and food supporting member for skewered food that is capable of cooking the food while effectively utilizing heat from a heating means.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for cooking food on skewers, comprising:
a plurality of holding members for holding skewers for skewering food;
rotating means for rotating the holding members;
an apparatus main body;
a plurality of cassettes removably mounted to the main apparatus body; and
heating means for cooking food skewered by the skewers;
wherein:
each of the plurality of cassettes is provided with at least one of the plurality of holding members,
the rotating means includes a plurality of rotational drive sources with adjustable speeds of rotation respectively connected to the plurality of holding members, and
at least two of the plurality of cassettes are mounted in a vertical column on the main apparatus body such that the main apparatus body is oblong in shape.

2. The apparatus according to claim 1, wherein:
the holding means and the rotational drive sources are arranged at the respective cassettes so that it is possible to adjust rotational speed of the holding members for each respective cassette.

3. The apparatus for cooking food on skewers as disclosed in claim 1,
wherein all of the plurality of cassettes are mounted on the apparatus main body such that they form one single column.

4. The apparatus for cooking food on skewers according to claim 1, further comprising:
a juice receiving member, for receiving juice created during cooking of the food skewed by the skewers supported by the holding members provided at upper side cassettes of the plurality of cassettes installed at the main apparatus body with a vertical positional relationship, arranged at a position on a lower side from the holding members of cassettes on the upper side.

5. An apparatus for cooking food on skewers, comprising:
a plurality of holding members for holding skewers skewering food; rotating means for rotating the holding members; and
an apparatus main body provided with heating means for cooking food skewered by the skewers,
wherein:
the rotating means includes a plurality of rotational drive sources with adjustable speeds of rotation, with the rotational drive source being respectively connected to at least one of the plurality of holding members, and with rotational speeds of the plurality of holding members being adjustable;
the holding means and the rotational drive sources are arranged at the respective cassettes so that it is possible to adjust rotational speed of the holding members for each respective cassette; and
the heating means adopts a dual surface heating method where surfaces on mutually opposite sides are heating surfaces, the cassettes are arranged at positions opposite the respective heating surfaces of the heating means, and axial directions of central axes of rotation of the holding members provided at the cassettes are in directions parallel with the heating surfaces.

6. An apparatus for cooking food on skewers, comprising:
a plurality of holding members for holding skewer skewing food;
rotating means for rotating the holding members;
an apparatus main body provided with heating means for cooking the food skewered by the skewers rotated by the rotating means, and a plurality of cassettes capable of being freely detached from and installed at the main apparatus body,
wherein:
the rotating means includes a plurality of rotational drive sources with adjustable speeds of rotation, with the rotational drive source being respectively connected to at least one of the plurality of holding members, and with rotational speeds of the plurality of holding members being adjustable;

the holding means and the rotational drive sources are arranged at the respective cassettes so that it is possible to adjust rotational speed of the holding members for each respective cassette; and the main apparatus body is a box with the heating means arranged within the box, the cassettes pass through an opening formed in the main apparatus body so as to be inserted into the main apparatus body in a freely removable manner, so that when all of the cassettes are inserted into the opening so as to be installed, the inside of the main apparatus body is a sealed space or a substantially sealed space.

7. An apparatus for cooking food on skewers, comprising:

a main apparatus body;

at least one cassette provided with holding members for holding food on skewers; and rotating means for rotating the holding members, wherein:

the rotating means have speeds that are separately adjustable for each individual cassette, the main apparatus body contains a cooking space for cooking the food, and at least one opening formed in the main apparatus body for enabling the cooking space and the outside of the main apparatus to communicate and for extracting and inserting the at least one cassette in the main apparatus body, the at least one cassette matches at least one opening such that the cassette is capable of freely passing through the opening to become mounted or detached, and the cooking space becomes a sealed or substantially sealed space when all the cassettes are inserted into the opening so as to be installed at the opening.

8. The apparatus for cooking food on skewers as disclosed in claim 7, wherein heating means for cooking the food is located at the main apparatus body.

9. The apparatus for cooking food on skewers as disclosed in claim 7, wherein heating means for cooking the food is located at the cassette.

10. The apparatus for cooking food on skewers as disclosed in claim 7, wherein a juice receiving member for receiving juice created during cooking of the food is provided positioned at a side lower than the holding member of the cassette.

11. The apparatus for cooking food on skewers as disclosed in claim 7, wherein the number of cassettes provided is a plurality, the number of the cooking spaces is the same as the number of cassettes, with the cooking spaces being mutually partitioned so as to be non-continuous partitioned spaces.

12. The apparatus for cooking food on skewers as disclosed in claim 11, wherein heating means for cooking the food are provided respectively at each of the cooking spaces at the main apparatus body.

13. The apparatus for cooking food on skewers as disclosed in claim 11, wherein heating means for cooking the food are provided respectively at each of the cassettes.

14. The apparatus for cooking food on skewers as disclosed in claim 11, wherein at least two cooking spaces of the plurality of cooking spaces are provided with a vertical positional relationship within the main apparatus body.

15. The apparatus for cooking food on skewers as disclosed in claim 12 or claim 13, wherein heating temperatures of respective heating means can be individually adjusted.

16. The apparatus for cooking food on skewers as disclosed in claim 7, wherein a see-through part enabling the cooking space within the main apparatus body to be observed from outside of the main apparatus body when the cassette is inserted in the opening is provided in the main apparatus body.

17. An apparatus for cooking food on skewers, comprising:

a main apparatus body having a wall member forming a cooking space supporting food being cooked therein;

a heater provided in such a manner that a heat-emitting section is positioned at an upper part of the cooking space; and a food holding mechanism for positioning food downwards from the heat-emitting section and being capable of holding horizontally laid skewers in a manner enabling free rotation about a center axis of the skewers, wherein the food holding mechanism has a holding member for holding one end of a skewer and a rotating mechanism for rotating the holding member about an axial center of the skewer, and the holding member has a rod member provided with a hole for one end of the skewer to plug into, and a branching member with one end supported at the rod member, an extending in a standing position along the skewer towards the side of the food.

18. An apparatus for cooking food on skewers, comprising:

a main apparatus body having a wall member forming a cooking space supporting food being cooked therein;

a heater provided in such a manner that a heat-emitting section is positioned at an upper part of the cooking space; and a food holding mechanism for positioning food downwards from the heat-emitting section and being capable of holding horizontally laid skewers in a manner enabling free rotation about a center axis of the skewers, wherein the food holding mechanism has a holding member for holding one end of a skewer and a rotating mechanism for rotating the holding member about an axial center of the skewer, and the holding member has a rod member provided with a hole for one end of the skewer to plug into, and a pair of mesh members extending along the skewer supported at the rod member and so as to sandwich the food from both sides.

* * * * *